(12) United States Patent
Ursem et al.

(10) Patent No.: US 9,604,228 B2
(45) Date of Patent: Mar. 28, 2017

(54) APPARATUS WITH CONDUCTIVE STRIP FOR DUST REMOVAL

(71) Applicant: Memic Europe B.V., Gassel (NL)

(72) Inventors: Willibrordus Nicolaas Johannes Ursem, Delft (NL); Elisabeth Johanna Jacoba Van de Vorle-Houben, Gassel (NL); Johannes Anthonius Wilhelmus de Haar, Bemmel (NL)

(73) Assignee: Memic Europe B.V., Gassel (NL)

( * ) Notice: Subject to any disclaimer, the term of this patent is extended or adjusted under 35 U.S.C. 154(b) by 16 days.

(21) Appl. No.: 14/357,302

(22) PCT Filed: Nov. 9, 2012

(86) PCT No.: PCT/NL2012/050792
§ 371 (c)(1),
(2) Date: May 9, 2014

(87) PCT Pub. No.: WO2013/070078
PCT Pub. Date: May 16, 2013

(65) Prior Publication Data
US 2015/0107456 A1    Apr. 23, 2015

(30) Foreign Application Priority Data

Nov. 9, 2011  (NL) .................................. 2007755
Apr. 11, 2012 (NL) .................................. 2008621
Jul. 27, 2012 (EP) .................................. 12178153

(51) Int. Cl.
*B03C 3/41* (2006.01)
*B03C 3/04* (2006.01)
*B03C 3/47* (2006.01)
*B03C 3/08* (2006.01)
*B03C 3/09* (2006.01)
*B03C 3/36* (2006.01)
*B01D 53/32* (2006.01)

(52) U.S. Cl.
CPC ................ *B03C 3/41* (2013.01); *B01D 53/32* (2013.01); *B03C 3/04* (2013.01); *B03C 3/08* (2013.01);
(Continued)

(58) Field of Classification Search
CPC combination set(s) only.
See application file for complete search history.

(56) References Cited

U.S. PATENT DOCUMENTS 7,051,402 B1    5/2006  Rigby
7,465,339 B2 *  12/2008 Tanaka ............... B01D 46/0023
                                         422/186.04

(Continued)

FOREIGN PATENT DOCUMENTS

AU    2010283886    6/2011
DE    3418112       11/1985

(Continued)

*Primary Examiner* — Duane Smith
*Assistant Examiner* — Sonji Turner
(74) *Attorney, Agent, or Firm* — Occhiuti & Rohlicek LLP

(57) ABSTRACT

The invention provides a gas purification system, for instance for agricultural application comprising a corona discharge system, the corona discharge system comprising a counter electrode, a conductive strip with a longitudinal edge comprising tooth structures, wherein the tooth structures have tooth tops with shortest distances selected from the range of 2-200 mm; and a voltage generator configured to apply a DC voltage of at least 10 kV to the conductive strip.

20 Claims, 26 Drawing Sheets

(52) U.S. Cl.
CPC ............... *B03C 3/09* (2013.01); *B03C 3/368* (2013.01); *B03C 3/47* (2013.01); *B01D 2257/406* (2013.01); *B01D 2257/90* (2013.01); *B01D 2257/91* (2013.01); *B01D 2258/01* (2013.01); *B01D 2258/0266* (2013.01); *B01D 2258/06* (2013.01); *B03C 2201/10* (2013.01); *B03C 2201/30* (2013.01)

(56) References Cited

U.S. PATENT DOCUMENTS

| | | | | |
|---|---|---|---|---|
| 8,308,846 | B2* | 11/2012 | Op de Laak | ............... B03C 3/41 60/275 |
| 2008/0163754 | A1* | 7/2008 | Tanaka | ............... B01D 46/0023 96/55 |
| 2010/0251889 | A1* | 10/2010 | Haruna | ............... B03C 3/08 95/79 |
| 2010/0294129 | A1 | 11/2010 | Op de Laak et al. | |
| 2011/0052464 | A1 | 3/2011 | Drewnowski et al. | |

FOREIGN PATENT DOCUMENTS

| | | |
|---|---|---|
| DE | 3832879 | 4/1989 |
| EP | 1547693 | 6/2005 |
| EP | 1666152 | 6/2006 |
| EP | 1829614 | 9/2007 |
| EP | 1829615 | 9/2007 |
| EP | 2208538 | 7/2010 |
| EP | 2343090 | 7/2011 |
| JP | 1-114050 | 8/1989 |
| WO | 2011/010918 | 1/2011 |

* cited by examiner

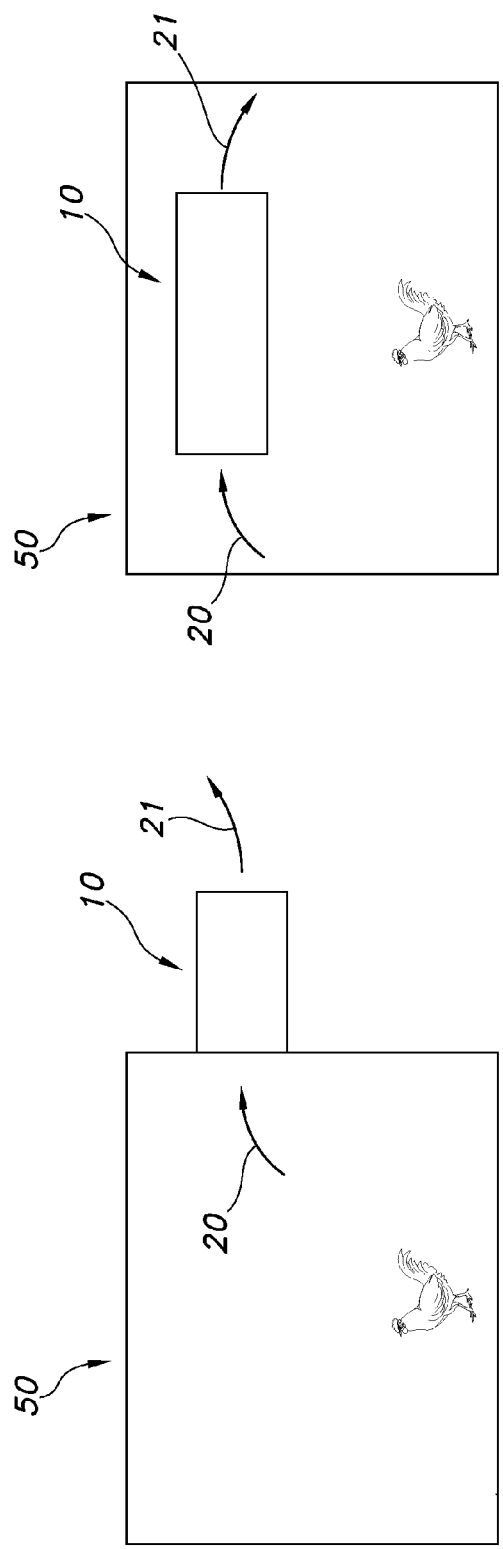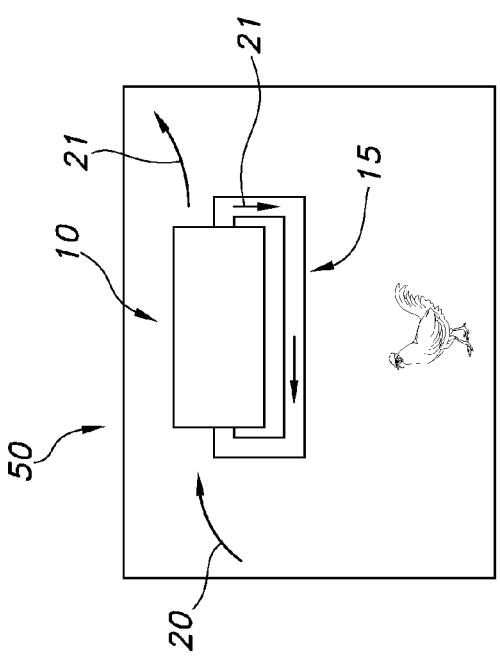

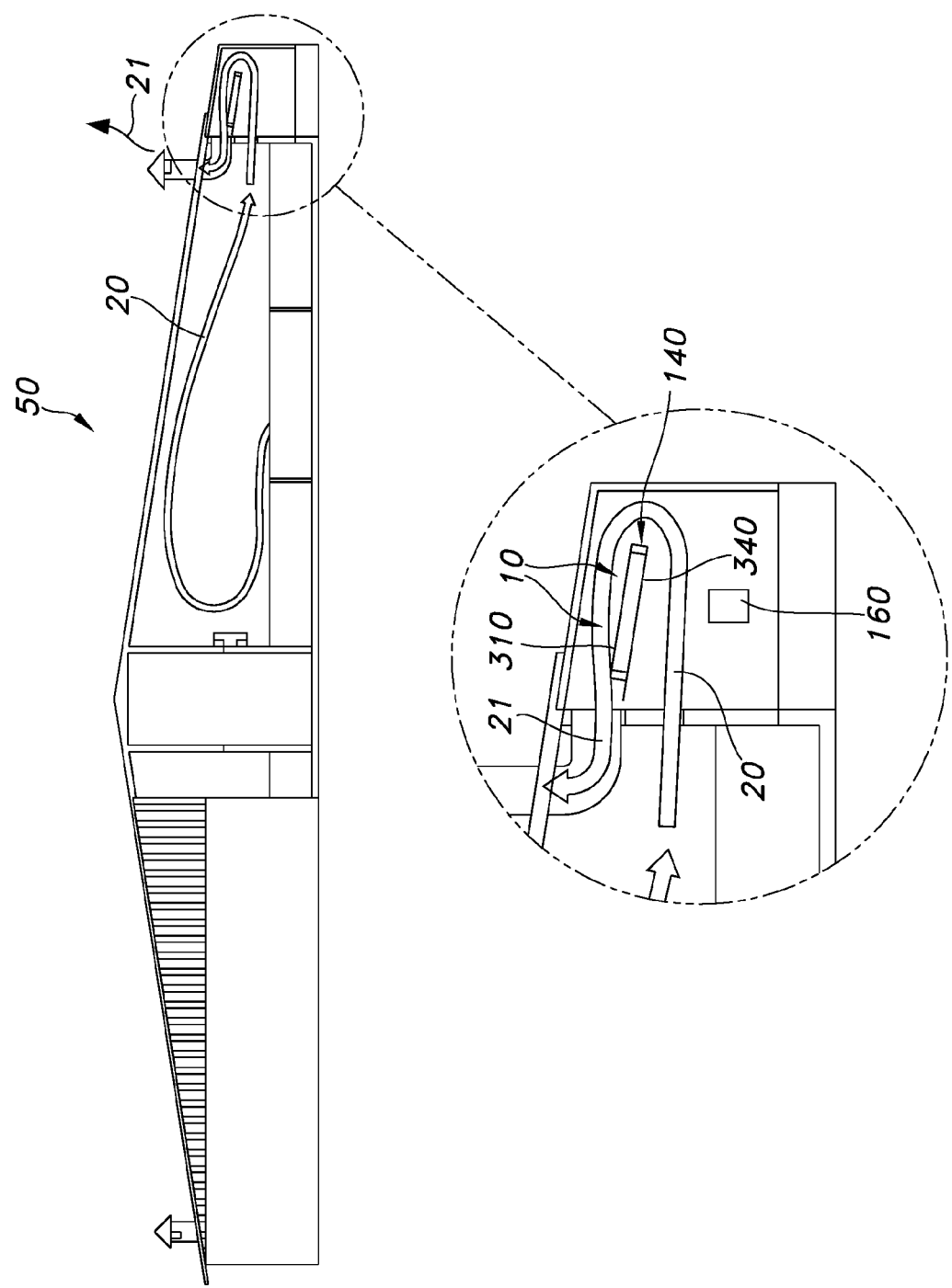

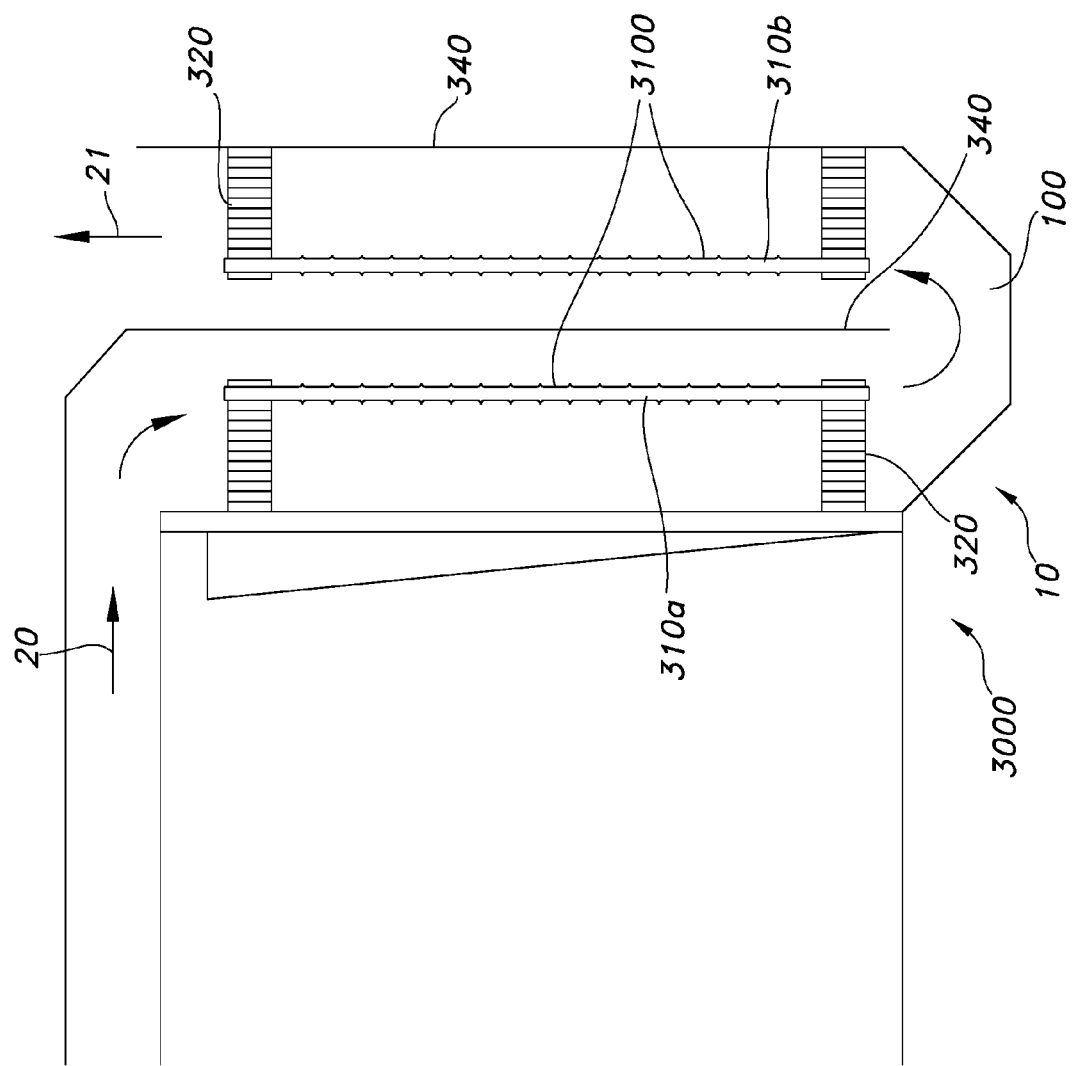

APPARATUS WITH CONDUCTIVE STRIP FOR DUST REMOVAL

CROSS REFERENCE TO RELATED APPLICATIONS

This application is a National Stage of International Application No. PCT/NL2012/050792 filed on Nov. 9, 2012, which claims priority to Dutch Application No. 2007755 filed on Nov. 9, 2011, Dutch Application No. 2008621 filed on Apr. 11, 2012 and European Application No. 12178153.8 filed on Jul. 27, 2012, the contents of which are hereby incorporated by reference in their entirety.

FIELD OF THE INVENTION

The invention relates to a gas purification system, to an accommodation equipped with such gas purification system, to the use of the purification system, and to a method for purifying gas, especially air, from an accommodation with the use of such gas purification system.

BACKGROUND OF THE INVENTION

Smut particles, fine dust and exhaust gas particles, of for instance traffic, are a source of pollution with undesired consequences on public health. In order to prevent the exhaust of such particles or in order to remove the exhausted particles, a number of methods are known in the art. For instance, smut filters and catalysts can be used in exhaust systems to reduce the exhaust of such particles. Nevertheless, there may still be some emission of those particles.

Other solutions are for instance described in U.S. Pat. No. 6,511,258. U.S. Pat. No. 6,511,258 describes a method for controlling the amount of ionized gases and/or particles suspended in the air above roads, streets, open spaces or the like. This is done by establishing an electrical field between the top layer of a road, street, open space or the like, and the ionized gases and/or particles. By controlling the electrical field the amount of ionized gases and/or particles can be controlled, which are attracted or repelled. The electrical field is established by making at least the top layer of the surface concerned electrically conductive and connecting it to earth or to one pole of an electrical voltage generator. In order to make the surface electrically charged, a network of conductive metal or a piezoelectric material is employed under the top layer which is placed in contact with earth or a negative voltage generator. The electrically charged top layer may also be composed of a coating which is laid on top of the entire or parts of the surface, for example in the form of road marking or the like. This solution provided by U.S. Pat. No. 6,511,258 is a rather complicated solution that has the disadvantage that only positively charged particles are caught at the surface.

U.S. Pat. No. 6,106,592 describes a gas cleaning process and apparatus for removing solid and liquid aerosols entrained in a gas stream. The gas to be treated is passed through a wetted, electrostatically charged filter media. The polarity of the electrostatic charge on the filter media is selected to enhance the removal of captured solid particles from the filter media. The apparatus is readily adaptable to a modular gas cleaning system configuration wherein varying numbers of the apparatus may be operated in parallel to provide a gas cleaning system of any desired gas flow capacity. Fields of 80-800 kV/m are applied.

EP0808660 describes a dust collector which can collect dust, especially fine dust (submicron particles). The dust collector, which removes dust and/or mist contained in a gas, comprises a charging means for charging dust and/or mist contained in a gas, a spraying means for spraying the charged dust or charged mist or spraying a dielectric material to the charged dust or mist, an electric field forming means for forming an electric field for subjecting the dielectric material to dielectric polarization, and a collecting means for collecting the dielectric material which have arrested at least either of the charged dust and charged mist. A field of 500 kV/m is applied.

WO2007100254 describes a method for the removal of smut, fine dust and exhaust gas particles from polluted air comprising providing a particle catch arrangement with a charged surface, the particle catch arrangement being arranged to generate a static electric field, wherein the electric field is at least 0.2 kV/m. The invention further provides a particle catch arrangement comprising a surface that can be charged, further comprising a generator arranged to generate charge to the surface that can be charged and to generate a static electric field of at least 0.2 kV/m, wherein the particle catch arrangement is part of, or integrated with, an object comprising street furniture.

SUMMARY OF THE INVENTION

There is a need for good and efficient systems that may remove for instance fine dust and/or germs from gas, especially from air. Prior art systems, such as described above, may not perform sufficiently and/or may further be optimized and/or may be simplified. Therefore, it is an aspect of the invention to provide an alternative gas purification system and method for purifying air, especially for agricultural applications, which preferably further at least partly obviate one or more of above-described drawbacks.

Hence, in a first aspect the invention provides a gas purification system (herein also indicated as "system" or "apparatus")) comprising a corona discharge system, the corona discharge system comprising (a) a conductive strip ("first electrode") with a longitudinal edge comprising tooth structures, wherein the tooth structures (longitudinal edges) have tooth tops with shortest distances (between the tooth tops) especially selected from the range of 0.5-1000 mm, especially selected from the range of 2-200 mm, and (b) a counter electrode ("second electrode"). The gas purification system may further comprise (c) a voltage generator configured to apply a DC voltage of preferably at least 5 kV, especially at least 10 kV, to the conductive strip. The voltage generator is especially configured to generate corona discharges at the tooth structures.

In a specific embodiment, the invention provides a motorized vehicle, comprising a gas purification system configured to purify an exhaust gas of the motorized vehicle, wherein the gas purification system comprises a corona discharge system, the corona discharge system comprising (a) a conductive strip (first electrode) with longitudinal edges, wherein one or more of the longitudinal edges (i.e. one longitudinal edge or both longitudinal edges) comprise tooth structures, wherein the tooth structures at the one or more longitudinal edges have tooth tops with shortest distances (especially along the relevant longitudinal edge), especially selected from the range of 2-200 mm, (b) a counter electrode (second electrode), and (c) a voltage generator configured to apply a DC voltage of especially at least 10 kV to the conductive strip.

In an embodiment, the gas purification system is especially configured to apply a voltage difference of at least 10 kV between the first electrode and the second electrode, with the former (the conductive strip) being configured as positive electrode; the latter especially being earthed (grounded).

Especially, the motorized vehicle, as indicated above, comprises a street sweeper comprising the gas purification system configured to purify the exhaust gas of a vacuum system of the street sweeper (and optionally or alternatively (also) the exhaust gas of an engine configured to propel the motorized vehicle). The vacuum system may especially be designed as outdoor vacuum litter collector, such as known in the art.

However, also other motorized vehicles are included herein (see below). In a further specific embodiment, the motorized vehicle (or more especially the gas purification system) comprises a plurality of said conductive strips, further comprises a gas channel comprising said plurality of conductive strips and said counter electrode, wherein the conductive strips are arranged in a zigzag like structure, and wherein the motorized vehicle is configured to allow an exhaust gas flow through the gas channel for purification of said exhaust gas.

The conductive strip is used as electrode (herein also indicated as "first electrode"), to which a potential is applied, preferably at least a voltage of 10 kV (i.e. during use, this electrode is positively charged with a voltage of e.g. at least 10 kV). It appears that with such configuration, gas comprising particles between the conductive strip and counter electrode, or even some distance away from the conductive strip and counter electrode and not between these electrodes, such as over a set of conductive strip and counter electrode, may be purified from particles. It further surprisingly appears that substantially better purification results are obtained than when using wires as electrodes and/or lower power consumption may be achieved. It also surprisingly appears that with the present invention, dimensional freedom is larger than with pure needles, which dimensional freedom may for instance be of relevance when applying the corona discharge system within a channel. Not only are the purification results better, also the energy consumption is lower.

The invention uses the principle that the electrode(s) create a kind of an "electric wind" and an electric charging of the particles in the air, which will be directed by the "electric wind" due to the electric field between the conductive strip (first electrode) and the counter electrode (second electrode). The charged particles may be guided in the direction of the second electrode and deposit (on the second electrode or counter electrode). In this way, gas, such as air, can be purified.

The term "corona discharge" is known in the art. A corona is a process by which a current, perhaps sustained, develops from an electrode with a high potential in a neutral fluid, usually air, by ionizing that fluid so as to create a plasma around the electrode. The ions generated eventually pass charge to nearby areas of lower potential, or recombine to form neutral gas molecules. When the potential gradient is large enough at a point in the fluid, the fluid at that point ionizes and it becomes conductive. If a charged object has a sharp point, the air around that point will be at a much higher gradient than elsewhere. Air (or another gas) near the electrode can become ionized (partially conductive), while regions more distant do not. When the air near the point becomes conductive, it has the effect of increasing the apparent size of the conductor. Since the new conductive region is less sharp (or curved), the ionization may not extend past this local region. Outside of this region of ionization and conductivity, the charged particles slowly find their way to an oppositely charged object and are neutralized. If the geometry and gradient are such that the ionized region continues to grow instead of stopping at a certain radius, a completely conductive path may be formed, resulting in a momentary spark, or a continuous arc.

Electric charges on conductors reside entirely on their external surface (see Faraday cage), and tend to concentrate more around sharp points and edges than on flat surfaces. This means that the electric field generated by charges on a curved conductive point is much stronger than the field generated by the same charge residing on a large smooth spherical conductive shell. When this electric field strength exceeds what is known as the corona discharge inception voltage (CIV) gradient, it ionizes the air about the tip, and a small faint purple jet of plasma can be seen in the dark on the conductive tip. Ionization of the nearby air molecules result in generation of ionized air molecules having the same polarity as that of the charged tip. Subsequently, the tip repels the like-charged ion cloud, and the ion cloud immediately expands due to the repulsion between the ions themselves. This repulsion of ions creates an "electric wind" that emanates from the tip. Next to induced "electric wind" by corona discharge, can also the existing particles or molecules in the air automatically been charged in the same manner. While bombarding molecules and particulate matter of 10 nanometres or more with electrons, the molecules and particulate matter, as existing air borne described, will be charged due to electron bombarding and release of existing electrons to become positive and enforced the "electric wind" in the same way as described by corona discharge contribution to create "electric wind".

The conductive strip comprises an electrically conductive material, such as iron, aluminium, copper, titanium or steel. Also a noble metal, such as ruthenium, rhodium, palladium, silver, osmium, iridium, platinum, or gold, may be applied. Further, also an alloy of two or more of the afore-mentioned metals might be applied. Especially stainless steel may be applied.

The conductive strip especially is an elongated electrode, and may therefore also be indicated as "elongated electrode or "elongated first electrode". The strip has (sharp) features on a longitudinal edge, or especially on both longitudinal edges. Such features may for instance be obtained by laser cutting, flow (water jet) cutting, whetting, polishing, punching, die-cutting, etc.

The strip will in general have two transversal ends (herein also indicated as "head" and "tail"), two longitudinal edges and two longitudinal faces. The distance between the transversal ends define the length of the strip; the distance between the two longitudinal edges define the height of the strip, and the distance between the two longitudinal faces define the width of the strip. In general, the length is larger than the width and the height, such as least 10 times. Further, in general the height ((i.e. without tooth structures) is larger than the width. In an embodiment, the conductive strip has a thickness in the range of 0.1-10 mm, especially in the range of 0.1-5 mm, such as 0.2-2 mm. The strip thus in general has two longitudinal edges, of which at least one comprises the herein indicated tooth structures. As indicated elsewhere, in an embodiment both longitudinal edges may comprise the herein indicated tooth structures.

Especially, the height/length ratio (of the strip) is especially <1 and the width/length ratio (of the strip) is especially <1. Further, preferably the height/width ratio is <1. In a specific embodiment, the ratios are independently height/length ratio <0.1, width/length ratio <0.1, and height/width ratio <0.5, such as ranges of 0.001-0.1 and 0.001-0.5, respectively. Hence, the height/length ratio and the width/ length ratio may each independently be <0.1, such in the range of 0.001-0.1, and the height/width ratio may (independent of the other values) be for instance <0.5, such as in the range of 0.001-0.5.

Especially, the height of the conductive strip is in the range of 1-500 mm, especially 2-50 mm (i.e. without tooth structures). Further, the length of the strip may for instance be in the range of 10 mm to 50 m, or even longer. In general, the strip will have a length in the range of 10 cm to 5 m. In case a plurality of strips is applied, in an embodiment also strips with different length may be applied, such as a subset of shorter strips and a subset of longer strips. For instance, in a longitudinal channel two longitudinally arranged strips and two transversal arranged strips (all in head-tail configuration) may be applied (see further also below and in the examples).

The term conductive strip may in an embodiment also refer to a plurality of conductive strips. In an embodiment, the (the individual conductive strips of the plurality of) conductive strips may be arranged parallel. As will be clear to person skilled in the art, "parallel" may especially refer to an arrangement wherein the longitudinal faces of two or more conductive strips (of the plurality of conductive strips) are arranged parallel to each other. The mutual smallest distance between two parallel arranged conductive strips is preferably at least 100 mm, especially at least 200 mm, even more preferably at least 300 mm, yet even more preferably at least 400 mm, like at least 500 mm. In an embodiment, the distances are not larger than 200 cm, like not larger than 150 cm. Such distances may also apply to conductive strips that are not electrically connected to each other and which are not configured parallel. However, in another embodiment, a plurality of conductive strips are applied, wherein two or more conductive stripes are arranged in a non-parallel configuration, such as a head-tail configuration, such as with a transversal end of one conductive strip adjacent to a transversal end of another conductive strip. Especially, they conductive strips may in such configuration be in electrically conductive contact. For instance, the plurality of conductive strips may be arranged in a ribbon like structure, or a zigzag like structure. Adjacent strips may be in physical contact with each other, especially a transversal end ("head or "tail") may be in physical contact with another strip, especially a transversal end of such strip ("tail" or "head"). In this way, the conductive strips may form a single conductor, through which the required electrical current may be transported. Such configuration may thus include a "head-tail configuration", such as in a zigzag configuration. A non-parallel configuration of strips may generate a more extended electrical field.

In one application, optionally also combinations of such embodiments may be applied. For instance, both parallel arranged strips and zigzag arranged strips may be applied. Optionally, an (elongated) gas channel may comprise in one part parallel arranged strips and in another part a non-parallel configuration of strips, like a zigzag like or ribbon like structure of strips. A gas comprising particles to be removed may be fed through such channel.

As indicated above, the strip may have a rectangular cross section. In alternative embodiments, the conductive strip has a cross section which is square, or a cross section selected from the group consisting of triangular, hexagonal, etc., and optionally polygonal (other than the already indicated rectangular, square, triangular, and hexagonal). In yet a further embodiment, a conductor is selected, which may be considered non-strip like, such as a conductor having a round cross-section.

Hence, in a yet a further aspect the invention provides a gas purification system (herein also indicated as "system" or "apparatus") comprising a corona discharge system, the corona discharge system comprising (a) a (elongated) first electrode (such as a conductive strip) with tooth structures, wherein the tooth structures have tooth tops with shortest distances (between the tooth tops) selected from the range of 0.5-1000 mm, especially selected from the range of 2-200 mm, and (b) a counter electrode ("second electrode"). The gas purification system may further comprise (c) a voltage generator configured to apply a DC voltage of preferably at least 5 kV, especially at least 10 kV, to the conductive strip.

The (elongated) first electrode is used as electrode, to which a potential is applied, preferably at least a voltage of 10 kV (i.e. during use, this electrode is positively charged with a voltage of e.g. preferably at least 10 kV). It appears that with such configuration, gas comprising particles between the (elongated) first electrode and counter electrode, or even some distance away from the (elongated) first electrode and counter electrode and not between these electrodes, such as over a set of (elongated) first electrode and counter electrode, may be purified from particles. It further surprisingly appears that substantially better purification results are obtained than when using wires as electrodes and/or lower power consumption may be achieved. It also surprisingly appears that with the present invention, dimensional freedom is larger than with pure needles, which dimensional freedom may for instance be of relevance when applying the corona discharge system within a channel. Not only are the purification results better, also the energy consumption is lower.

Herein, the invention is especially explained in relation to a conductive strip as (elongated) first electrode. However, in other aspects of the invention, the (elongated) first electrode comprises an (elongated) electrode comprising a cross section which is selected from the group consisting of triangular, hexagonal, polygonal (other than the already indicated rectangular, square, triangular, and hexagonal), round, oval. In yet a further aspect, the cross section is a lateral distortion (i.e. a distortion perpendicular to a longitudinal axis of the (elongated) first electrode) of such cross-section as mentioned before. At a plurality of positions along such (elongated) first electrode (i.e. at the longitudinal edge), superimposed on the above-indicated cross-section, the tooth structures are present. Hence, the herein defined cross-section can be seen as the basic or main cross section of the first (elongated) electrode, without taking into account the tooth structures.

Especially preferred cross-sections are triangular, square, rectangular, round or oval. However, as indicated above, the invention is especially explained in relation to a conductive strip as (elongated) first electrode.

The tooth structures are a kind of needles or other "sharp" structures which are present on one, or optionally both of the longitudinal edges. Optionally, in addition to the tooth structures at one or both longitudinal edges, tooth structures may also be present at one or more longitudinal faces. In most of the description below, for the sake of argument it is assumed that either on one of the longitudinal edges the tooth structures are present or on both of the longitudinal edges the tooth structures are present (thus without tooth structures at other faces).

The tooth structure may have the shape of a needle, a tetrahedron, a square pyramid, a pentagonal pyramid, a pyramid having more faces then pentagonal, a star pyramid, a wedge like shape (like a triangular prism), a cone, etc. The wedge like shape may have its ridge parallel to the longitudinal direction, or perpendicular, or under any angle with a longitudinal (of the strip). The tooth structures can therefore be seen as protrusions or extension on the longitudinal edge. The tooth structures are used to generate corona discharges (when the purification system is in operation). In an embodiment, the strip comprises a plurality of different types of tooth structures. The tooth structures can also be seen as extended parts or spikes on the conductive strip. Note that the conductive strip and tooth structures especially are a single unit or entity i.e. form an integral part (of the same material).

In an embodiment, the tooth structures have tooth structure heights, defined by the difference in height between the tooth tops and valleys between adjacent tooth structures, selected from the range of 0.5-500 mm, preferably in the range of 0.5-200 mm, such as 1-200 mm, like for instance 0.5-50 mm.

In an embodiment, the tooth structures have a ratio between the shortest distances and tooth structure height selected from the range of 0.5-1000, especially 1-500, such as 2-200 mm, even more especially 1.5-20, such as 2-5 (i.e. the height of the tooth structures is in general smaller than the spacing between adjacent tooth tops).

Alternative to the term "shortest distance", one might use spacing or interval or period. The shortest distance between adjacent tooth structures, i.e. between adjacent tooth tops is especially in the range of 0.5-1000, such as 1-500 mm, even more especially 2-200 mm, such as 5-100 mm. Hence, nearest neighbouring tooth structures have (shortest) distances of the tooth tops in the range of 0.5-1000 mm, such as 1-500 mm, etc. Note that in case of a strip with tooth structures at both longitudinal edges (or even at faces), the shortest distance between tooth tops refers to shortest distances between tooth tops at the same longitudinal edge (or face, if applicable).

Especially, the tooth structures are sharp structures. In an embodiment, each tooth structure has cross-sectional areas within an intra top distance in the range of 0-0.5 mm from the tooth top in the range of 10 mm$^2$ or smaller, especially in the range of 2 mm$^2$ and smaller, like 0.5 mm$^2$ and smaller. This implies that starting from the tooth top in a direction of the strip, over a distance of at least 0.5 mm, the cross-sectional area is at each cross-section 0.5 mm$^2$ or smaller. In an embodiment, this relative narrow cross-sectional area (of 10 mm$^2$ or smaller, especially in the range of 2 mm$^2$ and smaller, like 0.5 mm$^2$ and smaller) may even be found beyond the intra-top distance of 0.5 mm, for instance within at least 0.5 mm and up to 50-100% of the tooth structure height (measured from the top). For instance, when the tooth structure has a height of 10 mm, over 0-7.5 mm from the top (i.e. 75% of the tooth height, measured from the top), has such narrow cross section. In an embodiment, the cross-sectional area is lower than 0.1 mm (especially over 50% of the tooth height, measured from the top), and the tooth height is 0.5-5 mm. Hence, in an embodiment within said intra top distance (of at least 0.5 mm), measured from the tooth top, the tooth structure(s) may have the indicated (preferred) cross sectional area(s).

As indicated above, the tooth structures are preferably (relatively) sharp. The tooth structures especially have a tangent angle (θ) between tangents to the to the tooth top within an intra top distance in the range of 0-0.5 mm from the tooth top in the range of larger than 0° and equal to or smaller than 135° (in fact this may also be considered blunt), especially in the range of larger than 0° and equal to or smaller than 90°, even more especially the range of larger than 0° and equal to or smaller than 35°. Hence, in an embodiment within said intra top distance, measured from the tooth top, the tooth structure(s) may have the indicated (preferred) tangent angle(s).

In general, the sharper the structure, the easier the corona discharge may be generated. In a specific embodiment, the above indicated tangent angle(s) may even be found beyond the intra-top distance of 0.5 mm, for instance within at least 0.5 mm and up to 50-100% of the tooth structure height (measured from the top). For instance, when the tooth structure has a height of 10 mm, over 0-7.5 mm from the top (i.e. 75% of the tooth height, measured from the top), has such tangent angle(s). In an embodiment, the tangent angle(s) are equal to or smaller than 45° (especially over 50% of the tooth height, measured from the top), especially equal to or smaller than 35° (especially over 50% of the tooth height, measured from the top), and the tooth height is 0.5-5 mm.

In an embodiment, the tooth structures of one of the (elongated) (first electrode) edges point at the counter electrode. In case more than one counter electrode is applied, or in case the counter electrode is configured to circumvent at least partially the conductive strip, and in case more than one of the (elongated) edges (or a face) (of the (elongated) first electrode) comprise tooth structures, the tooth structures of more than one of the (elongated) edges may point at the counter electrode(s).

The combination of conductive strip and counter electrode are herein also indicated as "the electrodes". The counter electrode is of an electrically conductive material. The same materials as mentioned above, may be applied, such as stainless steel. The counter electrode may comprise a conductive plate, such as a stainless steel plate. In another embodiment, the counter electrode comprises a conductive wire mesh, such as a 2D wish mesh, or a 3D wire mesh.

However, the conductive plate (as embodiment of counter electrode) may also be a closed plate. As will be clear, the plate has electrical conductive properties, which may be due to the fact that the plate is of an electrical conductive material or comprises e.g. an electrical conductive surface. As indicated above, this counter electrode, especially such plate, may be flat or may be curved. In an embodiment, it may be in the form of an electrical conductive belt; however, it may also be a stationary plate, with the first electrode in its vicinity, especially configured parallel to the plate (to the plane of the plate). Hence, the plate can also be indicated as electrical conductive plate.

In yet another embodiment, which may be combined with the former embodiments, the counter electrode comprises one or more curvatures. Hence, in a specific embodiment, the counter electrode comprises a concave part, such as a concave plate. For instance, the counter electrode may comprise a (concave) conductive plate, having substantially the same length as the first electrode or strip.

The counter electrode may in an embodiment be integrated in for instance street furniture, see also below.

Especially, the counter electrode is grounded. Alternatively, the counter electrode has opposite sign of the first electrode (during operation of the gas purification system). It appears that an electric field is created that may lead the particles to the counter electrode, especially when the conductive strip (first electrode) is configured as positive electrode (during use). Hence, the voltage generator may especially be arranged to generate a positive charge at the conductive strip (during use). In yet a further embodiment, the counter electrode is earthed (grounded). Especially, the conductive strip is configured as positive electrode, the voltage generator may especially be arranged to generate a positive charge at the conductive strip (during operation of the gas purification system), and the counter electrode is earthed (and the voltage generator thus further arranged to generate the herein indicate voltage between the electrodes). Hence, especially the voltage generator is arranged to generate the herein indicate voltage between the first electrode and second electrodes, i.e. especially between the conductive strip (with tooth structures) and counter electrode, with the former preferably being positively charged (during use), and the latter preferably being grounded (earthed).

Optionally however, the counter electrode is negatively charged. Therefore, in an embodiment the voltage generator may especially be arranged to generate a positive charge at the conductive strip and a negative charge at the counter electrode (and the herein indicated voltage between the electrodes).

In an alternative embodiment, the conductive strip is negatively charged and the counter electrode is earthed or positively charged. Therefore, in an embodiment the voltage generator may especially be arranged to generate a negative charge at the conductive strip and a positive charge at the counter electrode (and the herein indicated voltage between the electrodes).

Preferably, the conductive strip is positively charged, and the counter electrode is earthed or is negatively charged (during use). Preferably, a static electric field is applied (see also below). Hence, in a preferred embodiment, the counter electrode is configured to be grounded during use, and in another embodiment, the counter electrode is configured to be negatively charged during use.

The voltage generator may be any voltage generator suitable for generating a DC voltage. Optionally an AC signal may be superimposed on the DC voltage, as long as (during use of the apparatus) the sign of the signal does not change. The voltage generator may especially be configured to apply (during use of the apparatus) a DC voltage of at least 10 kV to the conductive strip, more preferably a DC voltage of at least 20 kV, and optionally an AC signal superimposed on the DC voltage. Hence, the method of the invention includes applying a DC voltage of at least 10 kV, preferably at least 20 kV to the conductive strip. The voltage applied may especially not be larger than 50 kV, such as not larger than 40 kV, especially not larger than 30 kV (i.e. especially between the conductive strip and the counter electrode, with the conductive strip having the indicated voltage relative to the counter electrode).

Optionally, (as indicated above) a negative voltage is applied to the conductive strip. In those instances, the indicated voltages are the same, but with opposite sign. In such instances, the counter electrode may also be grounded. Optionally, the counter electrode is positively charged, see also below. Hence, in such embodiments, the voltage generator may in fact be configured to apply a DC voltage of at least −5 kV (i.e. −5 kV and more negative potentials), especially at least −10 kV (i.e. −10 kV and more negative potentials), to the conductive strip.

Hence, in an embodiment, during use, a voltage difference of preferably at least 10 kV, such as 10-50 kV, especially 10-40 kV, such as 10-30 kV, like at least 12 kV, is applied between the conductive strip and the counter electrode, with in an embodiment the conductive strip having a higher voltage than the counter electrode. For instance, to the conductive strip a voltage of 10 kV may be applied, while the counter electrode being earthed (grounded).

As indicated above, the counter electrode is preferably earthed, although in an embodiment, during use this counter electrode may also be negatively charged. Hence, in an embodiment, the voltage generator may be configured to apply (during use) a positive charge to the conductive strip and optionally a negative charge to counter electrode or the counter electrode is earthed. Hence, in an embodiment the conductive strip may be configured as positive electrode (during use) and the counter electrode may be earthed.

The voltage generator may further be configured to apply an electric current of at least 5 µA, such as at least 8 µA, more especially at least 10 µA, per meter conductive strip. With lower currents, the discharge may not be created or may not be effective enough. Hence, the method of the invention may further comprise applying an electric current of at least 5 µA, such as at least 8 µA, more especially at least 10 µA, per meter conductive strip 310. Further, the gas purification system, more precisely the corona discharge system, may be configured to generate a current of at least 0.1 µA, even more especially at least 0.2 µA between the conductive strip and counter electrode, per tooth structure. Hence, assuming a strip with 10 tooth structures, the current generated between the conductive strip and counter electrode may for instance be 1 µA.

Preferably, the corona discharge system may be configured to generate a current of not more than 1 A, especially not more than 50 mA, such as not more than 10 mA, especially not more than 5 mA, such as at maximum 500 µA per conductive strip. In yet a further embodiment, the corona discharge system may be configured to generate a current of especially not more than 100 µA between the conductive strip and counter electrode, per tooth structure, such as not more than 40 µA between the conductive strip and counter electrode, per tooth structure.

Due to the application of a positive (or negative) voltage to the conductive strip (during use of the system), an electric field is created between the conductive strip and the conductive counter electrode. Hence, the corona discharge system is especially arranged to create an electric field between the conductive strip (first electrode) and the counter electrode. The electric field is especially in the range of about 0.1-100 kV/m. In a specific embodiment, the electric field is in the range of about 0.5-100 kV/m, even more especially in the range of about 2-100 kV/m, yet even more especially in the range of about 4-100 kV/m. Especially, the electric field may be smaller than about 50 kV/m, more especially smaller than 20 kV/m. The electric field is applied between a first electrode, especially being a positive electrode arranged to generate a corona discharge, and a second electrode, especially being an earthed electrode.

In an embodiment, the tooth structures point in a direction of the counter electrode, i.e. the conductive strip and counter electrode are configured in such a way that the tooth structures point in a direction of the counter electrode. However, in yet another embodiment, the tooth structures may point in another direction. Depending upon the dimensions of the gas purification system and upon gas flow conditions, it may be desirable to select such configuration.

Even when pointing in a different direction, an electrical field may be generated between the conductive strip and the counter electrode. Hence, in another embodiment, the tooth structures point in a direction away from the counter electrode, i.e. the conductive strip and counter electrode are configured in such a way that the tooth structures point in a direction away from the counter electrode. When using a strip with tooth structures pointing in different directions, the tooth structures may in an embodiment all be configured to direct in a direction parallel to the counter electrode (assuming a plate like counter electrode), or in an embodiment part of total number of the tooth structure may point in a direction of the counter electrode and part of the total number of tooth structures may point in a direction away from the counter electrode. However, other configurations may also be possible.

Assuming an earthed counter electrode, preferably, the counter electrode is (arranged to be) from any other earthed surface or conductive surface (in the vicinity of the conductive strip) preferably the closest to the conductive strip. Assuming a negatively charged or earthed counter electrode and a positively charged conductive strip, the counter electrode is (arranged to be) from any other earthed surface or conductive surface (in the vicinity of the conductive strip) preferably the closest to the conductive strip. Assuming a positively charged earthed counter electrode and a negatively charged conductive strip, the counter electrode is (arranged to be) from any other earthed surface or conductive surface (in the vicinity of the conductive strip) preferably the closest to the conductive strip. As indicated above, the counter electrode is electrically conductive (as also the conductive strip is).

The term counter electrode may also refer to a plurality of counter electrodes. For instance, the conductive strip may be arranged between two or more counter electrodes. The distance from the conductive strip to the respective counter electrodes may be the same for each counter electrode, but may optionally also differ. In an embodiment, the conductive strip is attached to (one or more) isolators, such as, wherein each isolator, such as a bushing, has a creeping length, wherein the creeping length is preferably configured to be at least 5 mm creeping length per kV DC voltage, especially at least 10 mm creeping length per kV DC voltage. Such isolator, such as a bushing, may comprise one or more through holes (preferably substantially) perpendicular to a longitudinal axis of the isolator, such as a bushing, configured in one or more residing parts of the isolator, such as a bushing. In this way, the cavity (cavities) between two extending disks of the isolator, such as a bushing, may better be subjected to a gas flow, thereby preventing and/or reducing fouling within the cavity.

The isolator(s), such as bushing(s), can be used, as will be clear to a person skilled in the art, to arrange the first electrode (especially conductive strip) in electrical isolation from an electrically conductive surface (except for one or more electrode connections with the voltage generator), such as for instance the counter electrode. Herein, as example of isolators, often bushings are used. However, other isolators may be used as well.

Hence, the conductive strip (as first electrode) is in an embodiment remote from the counter electrode. In an embodiment, the conductive strip is not in electrically conductive connection with the counter electrode due to a non-zero distance. For instance, this distance may be created by arranging isolators, such as between the conductive strip and the counter electrode (see also above). In an embodiment, the closest electrically conductive surface (other than the conductive strip), is at a non-zero distance from the conductive strip. In an embodiment, the closest electrically conductive surface (other than the conductive strip), is at a non-zero distance from the conductive strip, which may be created by arranging isolators, such as between the conductive strip and the closest electrically conductive surface.

Optionally a gas transport unit may be applied to transport gas (comprising smut or fine dust or other undesired particles) through the gas purification system. As the gas purification system does not necessarily comprise a gas channel (see below), the phrase "transporting gas through the gas purification system" and similar phrases, may also refer to "leading gas over or along the set of first electrode and counter electrode. As the counter electrode may especially be a plate, the gas may be led over the counter electrode at the side (first face) where the first electrode is configured. In an embodiment, the gas transport unit may be an engine, that is configured to provide energy and that thereby provides an exhaust gas. This exhaust gas may be exhausted from the engine in a gas flow (comprising said exhaust gas). In an embodiment, the gas transport unit may be configured to transport the exhaust gas through the a gas channel comprising the conductive strip(s) and the counter electrode(s), wherein the gas transport unit is configured to transport the exhaust gas with a flow speed, especially in the range of 2.5-25 m/s. In an embodiment, the gas transport unit is comprises by a vacuum system of a street sweeper. Such vacuum system can suck (with the gas transport unit) litter from the street (and also has an exhaust). Such vacuum system may exhaust gas with amongst others fine dust.

In a specific embodiment, the gas purification system comprises an (elongated) gas channel, the (elongated) gas channel comprising (especially enclosing) the counter electrode and the conductive strip, the gas purification system further comprising a gas transport unit, configured to transport gas through the (elongated) gas channel. An advantage of such system may for instance also be the relative ease with which gas flow and optionally gas circulation, may controlled.

In a specific embodiment, the (elongated) gas channel, has a first face, a second face opposite of the first face, edges, wherein the elongated gas channel further has (preferably) a rectangular cross-section, a channel height ($h1$), and a longitudinal axis; wherein the counter electrode within the elongated gas channel has a counter electrode distance ($d3$) to the first face, with in an embodiment $\frac{1}{2}h1 < d3 < h1$; wherein the conductive strip within the elongated gas channel has a first distance ($d1$) to the first face and a second distance ($d2$), measured from the tooth tops to the counter electrode, with in an embodiment $\frac{1}{2}h1 < d1 < h1$ and with in an embodiment $d1/d2 > 1$, wherein the conductive strip is preferably configured parallel to the edges. The fact that the conductive strip may be arranged parallel to the edges may especially indicate that the plane of the conductive strips is parallel to the edges. In an embodiment, the cross section (of the elongated gas channel) is square. In yet another embodiment, the cross-section (of the elongated gas channel) is rectangular, but non-square.

In a specific embodiment, the distances from the conductive strip to each of the first face and the edges are larger than the second distance ($d2$) from the conductive strip to the counter electrode. Especially such asymmetric configuration may provide the advantages of the invention, although a symmetric arrangement may in an embodiment also be applied.

Hence, in an embodiment, the invention also provides a gas purification system comprising: (a) an elongated gas channel, having a first face, a second face opposite of the first face, edges, wherein the elongated gas channel further has a, preferably rectangular, cross-section, a channel height ($h1$), and a longitudinal axis; (b) optionally a gas transport unit, configured to transport gas through the elongated gas channel; (c) a corona discharge system comprising: (c.i) a counter electrode within the elongated gas channel, having a counter electrode distance ($d3$) to the first face (with preferably $\frac{1}{2}h1 < d3 < h1$); (c.ii) a conductive strip within the elongated gas channel, having a first distance ($d1$) to the first face and a second distance ($d2$) to the counter electrode (with preferably $\frac{1}{2}h1 < d1 < h1$ and preferably $d1/d2 > 1$), wherein the conductive strip is preferably configured parallel to the edges; wherein $d2<d1$ and $d2<l1$, with $l1$ being the distance between the corona discharge electrode and the (nearest) edge; and (c.iii) optionally a voltage generator configured to apply a DC voltage of preferably at least 10 kV to the conductive strip, and especially configured to apply preferably a positive charge to the conductive strip (during use of the system).

Especially however, when seen from the first face in a direction of the second face, the counter electrode and the conductive strip are preferably beyond the first half of the gas channel, i.e. in general these will be situated in the lower half of the elongated gas channel. Hence, the counter electrode distance d3 to the first face is preferably $\frac{1}{2}h1<d3<h1$, with h1 being the height of the elongated gas channel (i.e. the distance between the first face and the second face). Likewise, the first distance d1 of the conductive strip to the first face is preferably $\frac{1}{2}h1<d1<h1$. An asymmetric arrangement of the conductive strip (and the counter electrode) may add to the effect of the purification method, although a symmetric arrangement may in an embodiment also be applied.

Of course the conductive strip and the counter electrode are not in (direct) contact. Their distance to each other is preferably defined as $d1/d2>1$, with d2 being the second distance of the conductive strip to the counter electrode. The conductive strip is configured parallel to the first face (and the second face and the edge faces, i.e. parallel to the longitudinal axis). However, in an embodiment, $d1/d2$ is in the range of 0.8-1.2.

Herein, the term "parallel" and similar terms may especially indicate that an angle with one or more of those faces (or longitudinal axis) is equal to or less than 2°, and especially substantially 0° with one or more of those faces (or longitudinal axis).

In a specific embodiment of the gas purification system, the first electrode comprises a plurality of first electrodes, and at least a subset of the first electrodes are configured parallel to the counter electrode and optionally parallel to each other (see also below), wherein the counter electrode comprises in an embodiment an electrical conductive plate. As further elucidated below, the plate like counter electrode may have a counter electrode first face, a counter electrode second face and a counter electrode edge.

Even more especially, the first electrode comprises a plurality of first electrodes, and at least a subset of the first electrodes are configured parallel to the counter electrode and are configured in a zigzag configuration (see also below), wherein said subset of the first electrodes forms a single conductor, and wherein the counter electrode comprises in an embodiment an electrical conductive plate. For instance, 2-16 first electrodes might be applied, consisting of one or more subsets. The distance between the first electrodes and the counter electrode may in an embodiment be bridged by insulators, such as bushings (see also below).

The first electrode may be configured at the first face (with a non-zero distance, for instance bridged by one or more insulators). However, in an embodiment at both sides of the (plate like) counter electrode, one or more first electrodes may be configured (with a non-zero distance, for instance bridged by one or more insulators).

The above preferred relations indicate an asymmetric arrangement of the conductive strip, with distances to the counter electrode being shorter than distances to any other conductive or earthed surface. However, in another embodiment, the conductive strip may also be arranged alternatively. For instance, as already indicated above, in an embodiment $d1/d2$ may be in the range of 0.8-1.2

Herein the term elongated gas channel may especially refer to embodiments wherein the length (longitudinal length) is larger than the width and height of the elongated gas channel. Therefore, the longitudinal axis will be longer than the centre lines (defining width and height) perpendicular to the longitudinal axis.

In general, to make use of gravity, the gas purification system is arranged—during use—such that the second face is the lower face, and the first face is above the second face. Hence, "opposite of the first face" may also indicate below the first face. In general, the first and the second face will be arranged horizontally. Hence, the first face may be the upper face or top face, and the second face may be the lower face or the bottom face. As indicated above, preferably, the cross-section (of the (elongated) gas channel) is rectangular. In an embodiment this may include square. The term "cross-section" herein especially refers to the cross-section of the (elongated) gas channel perpendicular to the longitudinal axis.

In yet a further embodiment, the conductive strip is arranged between two (or more) counter electrodes. The distance from the conductive strip to the respective counter electrodes may be the same for each counter electrode, but may optionally also differ. Hence, in a specific embodiment, the gas purification system comprises an (elongated) gas channel, the (elongated) gas channel comprising (especially enclosing) two or more counter electrodes and the conductive strip (especially arranged between the two or more counter electrodes), the gas purification system further optionally comprising a gas transport unit, configured to transport gas through the (elongated) gas channel. In an embodiment, two or more walls comprise the two or more counter electrodes, respectively.

Such gas purification system (but also other gas purification systems described herein) may be integrated into an existing gas channel or may be connected to an existing gas channel, for instance end of pipe.

In a specific embodiment, the (elongated) gas channel, has a first face, a second face opposite of the first face, edges, wherein the (elongated) gas channel further has (preferably) a rectangular cross-section, a channel height (h1), and a longitudinal axis; wherein the conductive strip within the (elongated) gas channel has a second distance (d2), measured from the tooth tops to a first counter electrode, and another second distance d2'), measured from the tooth tops to the second counter electrode. The conductive strip may in an embodiment be configured parallel to the edges. The fact that the conductive strip may be arranged parallel to the edges may especially indicate that the plane of the conductive strips is parallel to the edges. However, in zigzag arrangements and the like of conductive strips, this may not be the case. In an embodiment, the cross section (of the (elongated) gas channel) is rectangular or square.

As the gas channel preferably has a rectangular cross-section, the first and the second faces (of the gas channel) are parallel to each other; the edges (or (their) edge faces) are parallel to each other and perpendicular to the first and the second faces. All of those faces are preferably configured parallel to the longitudinal axis.

However, the gas channel may also have other types of cross-sections, such as round, triangular, hexagonal, etc., and optionally polygonal (other than the already indicated triangular, square, rectangular, and hexagonal). The gas channel may enclose one or more first electrodes (such as the herein indicated conductive strips with tooth structures), and the channel wall comprising e.g. earthed parts or the channel wall being earthed.

The gas transport unit is preferably present, although the gas purification system may also be part of a channel through which by natural pull gas flows in a direction from an inlet (or entrance) of the gas channel to an outlet (or exhaust) of the gas channel. However, in general the gas transport unit will be present (when applying a (elongated) gas channel). The term "gas transport unit" may also relate to a plurality of such units. The gas transport unit may comprise a pump, a ventilator, a blower, etc., or in principle any other means known in the art to generate a gas flow in a channel. Different types of gas transport unit may be applied to lead (flow) the gas (to be purified) through the (elongated) gas channel. The gas transport unit may be configured to blow or to suck the gas through the gas channel.

The conductive strip(s) may be (electrically) isolated from the (elongated) gas discharge channel, especially the first face, below which the conductive strip(s) may be positioned. Also in other configuration, the conductive strip(s) may be arranged in electrical isolation from the element it is connected to. This may for instance be the wall of a gas channel. To this end, insulators may be applied. The conductive strip may therefore be arranged between insulators, such as bushings (see also above). Especially, the isolator, such as a bushing may essentially consist of Teflon (PTFE), or a material with similar insulating properties. For instance, also polyoxymethylene (POM) or other materials may be applied. Herein, insulators are electrical insulators, which are herein also indicated as "isolators" (see also above).

Especially good results may also be obtained when the counter electrode is removable. In this way, the counter electrode may be cleaned from deposits. In a specific embodiment, the counter electrode is part of a belt of a conveyor belt, wherein the conveyor belt is configured to run the belt through the (elongated) gas channel. Outside the gas channel, the conveyor belt may be cleaned from deposit(s), and return to the internal of the gas channel, for receipt of new deposition. The belt may for instance comprise stainless steel parts. In an embodiment, the belt is from stainless steel. As will be clear to the person skilled in the art, the counter electrode comprises an electrically conductive material To further improve the result of the method, at least part of the purified gas may be returned to the gas purification system to be subjected again to the method for purifying air. Hence, the gas purification system may further comprise a gas return system, configured to recirculate at least part of the gas through the (elongated) gas channel.

In a further embodiment, the conductive strip is (though in electrical isolation) connected to the counter electrode. For instance, as indicated above, the counter electrode may be attached to the first face of the gas channel. However, as also indicated above, the application of the invention is not limited to specific gas channels (enclosing one or more first electrodes/conductive strips with tooth structures).

In an embodiment, the combination of conductive strip and counter electrode may be a (relative simple) arrangement of a plate like counter electrode and the conductive strip attached to the plate like counter electrode (but not in electrically conductive contact, such as with one or more isolators, such as in between). The plate like counter electrode may have a counter electrode first face, a counter electrode second face and a counter electrode edge. Such plate like electrode may have a thickness defined by the distance between the counter electrode first face and the counter electrode second face (i.e. the edge height). The conductive strip may be attached to the counter electrode first face (with isolators, such as in between); optionally a plurality of conductive strips may be arranged to the counter electrode first face.

Optionally, one or more conductive strips may also be arranged to the counter electrode second face. The former embodiments, i.e. with one or more conductive strips at only the counter electrode first face may be attached (with the second face) to a wall, or a ceiling, or may be integrated in a gas channel, etc. The former embodiment and the latter embodiments, i.e. with one or more conductive strips also at the counter electrode second face may be arranged to suspend from a ceiling (such as in a vertical arrangement).

As indicated above, when applying a plurality of conductive strips (at one face), they may for instance be arranged parallel or in a head-tail arrangement.

In yet a further aspect, the invention provides a method for purifying a gas, especially air, from an accommodation, wherein the accommodation may for instance be selected from the group consisting of for instance a shed, a stable, a sty, a fold and a poultry farm, wherein the method comprises leading gas of the accommodation through the gas purification system as defined herein, while applying a DC voltage of at least 10 kV to the conductive strip, with the conductive strip preferably being the positive electrode, and the counter electrode preferably being earthed. More in general, the invention further provides a method for purifying air comprising leading air through (or over) the gas purification system as defined herein, while applying a DC voltage of preferably at least 10 kV to the conductive strip ("first electrode"). The conductive strip especially may be enclosed within the (elongated) channel (see above and below).

Even more in general, the invention provides a method for purifying a gas, such as air or (comprising an) exhaust gas. This may e.g. the air in an accommodation or an exhaust gas (comprising gas) of an engine, e.g. an engine configured to propel a vehicle. Hence, in an aspect, the invention provides a method for purifying a gas (like air or a gas comprising an exhaust gas) comprising leading said gas through the gas purification system as described herein, while applying a DC voltage of especially at least 10 kV, especially at least 20 kV to the conductive strip. The method may further include transporting the gas through a gas channel comprising said conductive strip and said counter electrode with a flow speed in the range of 2.5-25 m/s. In an embodiment, the gas comprises an exhaust gas of a motorized vehicle, such as selected from the group consisting of a moped, a motor, a car, a truck, a coach, a train, a craft, a ship and a boat. For instance, the motorized vehicle comprises a street sweeper comprising the gas purification system configured to purify the exhaust gas of a vacuum system of the street sweeper. However, the gas purification system may also be applied to purify an exhaust gas (comprising gas) from an engine configure to propel such vehicle, or any other engine that exhaust an exhaust gas.

However, in alternative embodiments, the accommodation may be selected from the group consisting of a garage, a hangar, a plant or factory, a railway station, a bus station, etc. However, also outdoor applications of the gas purification system and/or method of the invention are conceivable. Such as along a road, at a square, outdoor at a plant, etc.; see also below when describing the particle catch arrangement.

In yet a further embodiment, the gas purification system may be configured to purify an exhaust gas, such as of a hydrocarbon based, such as a fossil fuel based, engine, like a diesel engine. This may be the engine of a motorized vehicle, like a moped, motor, a car, a truck, a coach, a train, etc., or a motorized craft, like a ship or boat, etc., or of any other motorized vehicle This engine may also be an engine of a non-mobilized application. The engine may be an engine for generating electricity, like an engine generator, such as a standby generator (using a hydrocarbon as fuel) etc. The term "hydrocarbon based engine" and similar terms relate to engines which combust such hydrocarbon to generate energy, such as mechanical energy and/or electrical energy. The hydrocarbon fuel may for instance comprise one or more of diesel, petrol, natural gas, liquid natural gas (LNG), compressed natural gas (CNG), and liquid propane gas, but also other (gaseous, liquid, or compressed) hydrocarbon fuels may be applied, which are known to the person skilled in the art. Hence, the engine may especially be configured to propel the motorized vehicle.

In yet another embodiment, the exhaust gas may be the exhaust of a street sweeper (also known as road sweeper or ground cleaning machine, etc.), i.e. especially the exhaust of a vacuum system of such street sweeper. The exhaust gas of such vacuum system is in general exhausted without treatment, which may lead to exhaust of fine dust, etc. The gas purification system of the invention may greatly reduce reduction of fine dust of such street sweeper. The gas purification system may thus be applied as a kind of gas filter. Also other vacuum clean exhaust gas may be purified by applying the purification system and method of the invention.

Hence, in an embodiment, the invention also provides a motorized vehicle, comprising the gas purification system as defined herein, configured to purify an exhaust gas of the motorized vehicle (such as the exhaust gas of a (diesel) engine of such motorized vehicle). Especially, the invention also provides an embodiment of a street sweeper comprising the gas purification system as defined herein, configured to purify the exhaust gas of a vacuum system of the street sweeper (and/or the exhaust gas of a (diesel) engine of such motorized vehicle. In yet a further embodiment, the gas purification system and method may be applied to purify an exhaust gas of a plant, such as a fossil fuel power station, or from a coal gasification plant, etc.

Hence, the emission of all also kind of applications which emit small particles, such as smut particles, fine dust particles and exhaust gas particles, may be subjected to the method of the invention. And thus, also all kind of applications which emit small particles, such as smut particles, fine dust particles and exhaust gas particles, may further include the purification system of the invention. The precise configuration of the gas purification system, such as a channel with the conductive strip with tooth structures, or the combination of the conductive strip with tooth structures and the counter electrode plate, etc., may be adjusted to the type of application. The application may be any application using an engine that emits small particles, especially exhaust gas particles, such as petrol or diesel engines, especially diesel engines. Such applications may be substantially immobile, like an engine for generating electricity, like an engine generator, such as a standby generator etc., but may also be mobile ("vehicle"), such as an engine of a transport means such as a boat or truck (see also above). The application may also be an application that generates small particles not (only) based on an engine, like a diesel engine, but based on other sources of such small particles. For instance, applications like a street sweeper (see also above), road building equipment, such as an asphalt distributor, a device or apparatus configure to machine (machining device or apparatus, such as configured for "traditional" machining processes, such as turning, boring, drilling, milling, broaching, sawing, shaping, planing, reaming, and tapping, or grinding, or even for modern machining such electrical discharge machining, electron beam machining, photochemical machining, and ultrasonic machining, etc.), like for instance a road cutting apparatus, a stone or concrete cutting apparatus, drilling machines, etc. etc.

The application may also be a device or apparatus, or site (location), configured for transhipment of bulk products like particulate bulk products such as maize, corn, fruit, nuts, potatoes, flour, sand, ore, vegetables, etc. etc. The gas purification system may in an embodiment be attached to the application or may in another embodiment be integrated in the application.

Especially, the method may comprise applying a DC voltage of at least 20 kV to the conductive strip. As indicated above, the conductive strip may be configured as positive electrode and the counter electrode may be earthed. The method may further comprise applying an electric current of at least 0.2 µA per tooth structure. In yet a further embodiment, the method may further comprise applying a stationary electric field between the conductive strip and the counter electrode in the range of 2-100 kV/m.

The system and method may (thus) be applied in existing accommodations such as a shed, a stable, a sty, a fold, or a poultry farm. Hence, the gas purification system and the method for purifying of the invention may especially be applied in agricultural applications. The term "accommodation" may relate to any cage, stable, shed, sty, fold, and also farm, for hosting one or more animals, especially a plurality of animals, such as pigs, cows, horses, goats, pigeons, birdhouse birds, tropical birds, gooses, mink animals or fir animals. The method may be applied within such building, or a unit (comprising the gas purification system, see below), may be provided to which the air of the building is guided for treatment according to the invention. The phrase "method for the removal" and/or the term "purification" include a partial removal and does not necessarily indicate a total removal or total purification. In an embodiment, the method may also be applied for purifying a gas, especially air, from other accommodations that are mentioned herein. As indicated above, in some embodiment "leading gas through the gas purification system" may also include leading gas over or along the set of counter electrode and first electrode, especially, when assuming a plate like counter electrode, at the side of the counter electrode where the first electrode (or conductive strip (with needles)) is configured.

However, as indicated above, the system and method may also be applied in for instance a garage, a hangar, a plant or factory, a railway station, a bus station; or in outdoor applications. However, the gas purification system may for instance also be used to remove undesired particles (and optionally gasses) from for instance (gas, especially air, from) a laboratory, a plant, a hospitality area, a clean room, an operation chamber, etc. The gas purification system may also be applied to clean an exhaust gas, such as from a plant, a motorized vehicle (such as a moped, a motor, a car, a coach, a truck, a train, a boat, etc.)(see also above).

Hence, the gas purification system of the invention may in an embodiment be used for cleaning gas, especially air, from an accommodation, such as for instance selected from the group consisting of a shed, a stable, a sty, a fold and a poultry farm, etc., or for instance selected from a laboratory, a plant, a hospitality area, a clean room, and an operation chamber, etc., but in an embodiment also for cleaning gas of other sources, such as indicated above. Especially, the gas purification system of the invention may be used for the removal of fine dust from a gas, especially air, and/or for the removal of germs like bacteria, viruses, spores, fungi (from a gas, especially air) and also for the removal of parasites (from a gas, especially air). More especially, the gas purification system of the invention may be used for the removal of fine dust from a gas and/or for the removal bacteria, viruses and fungi, from a gas, especially air.

The gas purification system may be arranged within the accommodation or may be arranged outside the accommodation (in gaseous contact with at least part of the atmosphere within the accommodation).

In a specific embodiment, especially when the air is humid or humidified, for instance humidified with a water haze, the gas purification system of the invention may also be used for the removal of ammonia ($NH_3$) and/or undesired odours, and/or other compounds, from a gas. In a specific embodiment, the apparatus further comprises a liquid atomizer or nebulizer, configured to provide a liquid haze, such as a water haze between the conductive strip and the counter electrode. The haze may be generated within the (elongated) gas channel, but may also be generated upstream from the inlet of the (elongated) gas channel. Hence, the invention also provides in a further aspect an accommodation, such as selected from the group consisting of a shed, a stable, a sty, a fold and a poultry farm, or another accommodation, such as indicated above, comprising the gas purification system, as described herein, for purifying the air of the accommodation.

However, as indicated above, the gas purification system, optionally including such liquid atomizer or nebulizer, may also be applied for gas purification of hydrocarbon based engines, or for purifying gas from an exhaust of a vacuum clean system, such as a street sweeper.

The invention further provides a particle catch arrangement comprising the gas purification system as defined herein, wherein at least part of the gas purification system is part of, or integrated with, an object comprising street furniture, for instance a sound barrier, a crash barrier, a tunnel wall, a road sign, a traffic information system, a street lamp or a traffic light.

For instance, the counter electrode may be part of such street furniture. This may also enclose embodiment wherein a part of street furniture is integrated in the gas purification system. For instance, part of a tunnel wall might be used as counter electrode. In a specific embodiment, the counter electrode is attached to or integrated in one or more of a sound barrier, a crash barrier, and a tunnel. In a specific embodiment, the gas purification system comprises the conductive strip and a plate-like counter electrode, wherein both are arranged parallel to the (local) earth's surface, wherein in an embodiment the counter electrode comprises a curved element, which may be attached to ore integrated in for instance a tunnel wall.

The term "substantially" herein, such as in "substantially parallel" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The apparatus herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. For instance, the term strip may also refer to a plurality of strips. The invention may be implemented by means of hardware comprising several distinct elements, and by means of a suitably programmed computer. In the device or apparatus claims enumerating several means, several of these means may be embodied by one and the same item of hardware. The mere fact that certain measures are recited in mutually different dependent claims does not indicate that a combination of these measures cannot be used to advantage.

The invention further applies to an apparatus comprising one or more of the characterising features described in the description and/or shown in the attached drawings. The invention further pertains to a method or process comprising one or more of the characterising features described in the description and/or shown in the attached drawings.

The various aspects discussed in this patent can be combined in order to provide additional advantages. Furthermore, some of the features can form the basis for one or more divisional applications.

BRIEF DESCRIPTION OF THE DRAWINGS

Embodiments of the invention will now be described, by way of example only, with reference to the accompanying schematic drawings in which corresponding reference symbols indicate corresponding parts, and in which:

FIGS. 5a-5f schematically depicts some applications of the gas purification system of the invention;

FIGS. 9a-9c schematically depict some further embodiments.

Figure 1A:
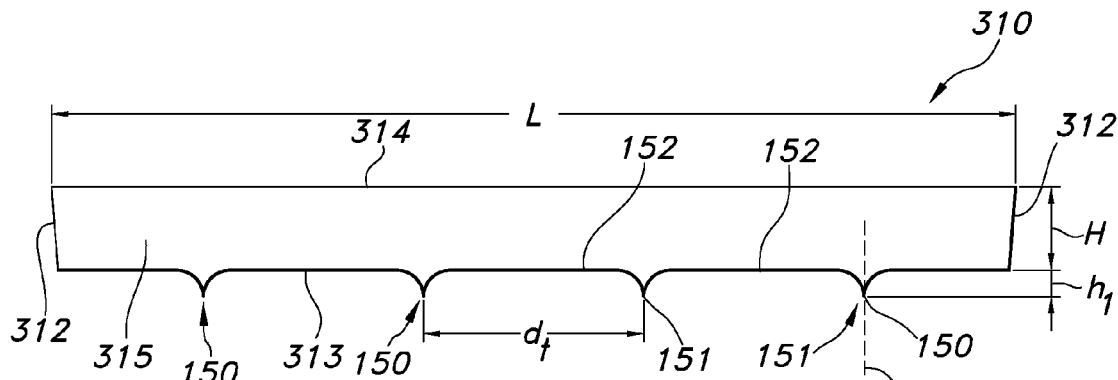
FIGS. 1a-1j schematically depict some aspect of possible variants of the conductive strip.

The drawings are not necessarily on scale

DESCRIPTION OF PREFERRED EMBODIMENTS

FIGS. 1a-1j schematically depict a non-limiting number of embodiments of the conductive strip, indicated with reference 310. Other variants may be possible as well.

The conductive strip 310 has a longitudinal edge 313 comprising tooth structures 150. The tooth structures 150 have tooth tops 151 with shortest distances dt, such as selected from the range of 0.5-1000 mm, especially selected from the range of 2-200 mm. Hence, the tooth tops 151 have shortest distances dt (between adjacent or nearest tooth tops 151) selected for instance from the range of 5-100 mm.

The conductive strip 310 has (first) longitudinal edge 313 and oppositely arranged thereof second longitudinal edge 314. These define height H of the conductive strip 310. Further, conductive strip 310 comprises transversal edges 312 (which may also be indicated as head an tail or head edge and tail edge, respectively), arranged opposite of each other, which may be arranged parallel to each other, and which define length L of the conductive strip 310. Further, conductive strip 310 comprises third longitudinal edges 315 (herein also indicated as longitudinal faces), with may be arranged parallel, and which define width W of the conductive strip 310.

Especially, the ratios are H/L<1 and W/L<1. Further, preferably the ratio H/W<1. In a specific embodiment, the ratios are H/L<0.1, W/L<0.1, and H/W<0.5, such as ranges of 0.001-0.1 and 0.001-0.5, respectively.

Especially, the transverse edge 312, the second longitudinal edge 314, and the third longitudinal edges 315 are perpendicular to each other.

The tooth structures 150 have tooth structure heights h1, defined by the difference in height between the tooth tops 151 and valleys 152 between adjacent tooth structures 150, selected from the range of 0.5-500 mm, preferably in the range of 1-200 mm. The length between the tooth valleys 152 of first longitudinal edge 313 and the second longitudinal edge 314 is the height H of the conductive strip 310 (see also above). Reference 158 indicates a tooth structure longitudinal axis.

In an embodiment, the longitudinal axes 158 point in the same direction. In yet another embodiment, the longitudinal axes 158 point in different directions (not depicted). Especially, the conductive strips 310 comprises a plurality of subsets of tooth structures 150, wherein the longitudinal axes 158 within one subset point in one direction, but wherein the longitudinal axes 158 of tooth structures 150 of different subsets point in different directions.

Figure 1B:
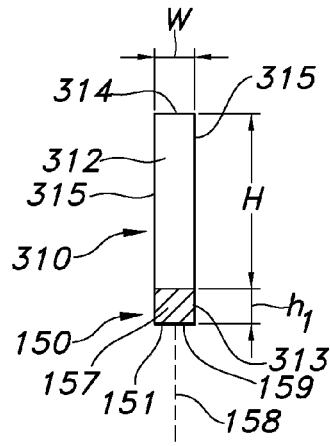
Figure 1C:
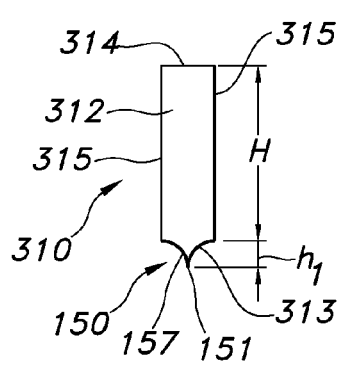
Figure 1D:
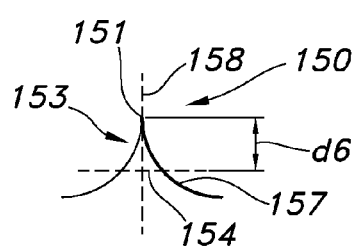
Figure 1E:
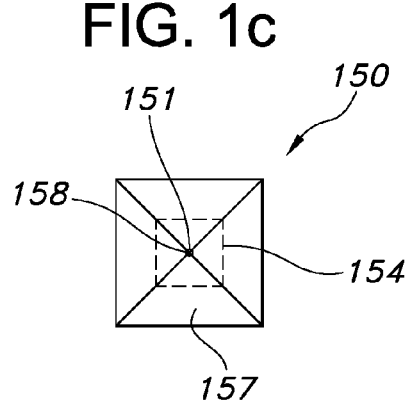
Figure 1F:
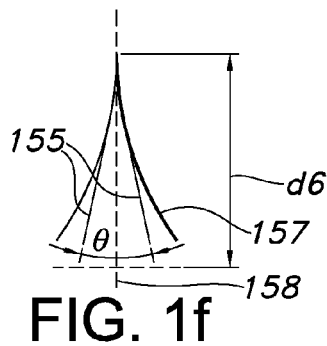
Figure 1G:
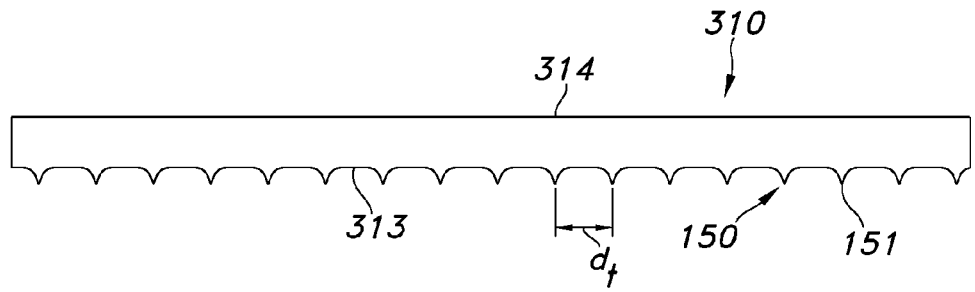
Figure 1H:
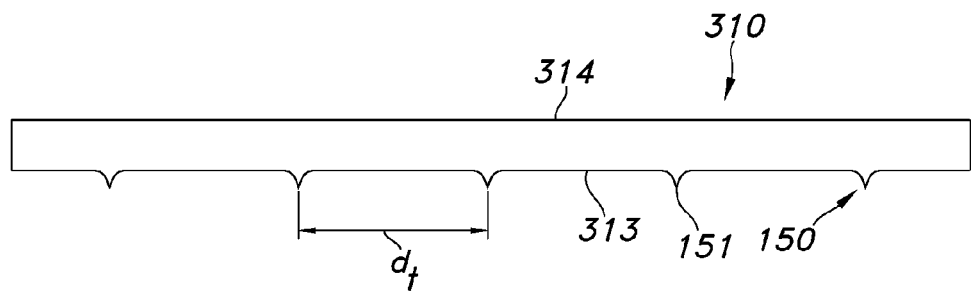
Figure 1I:
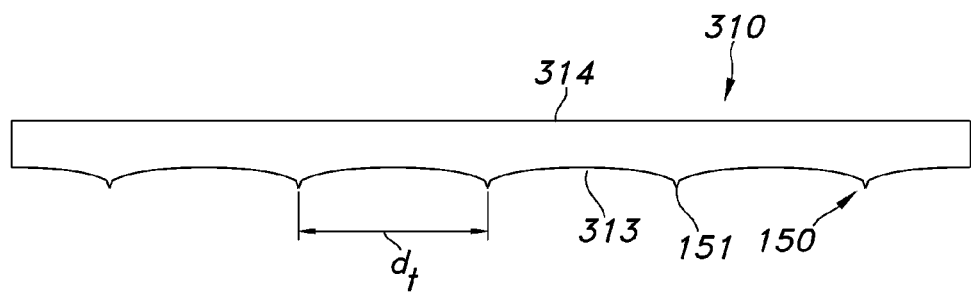
Figure 1J:
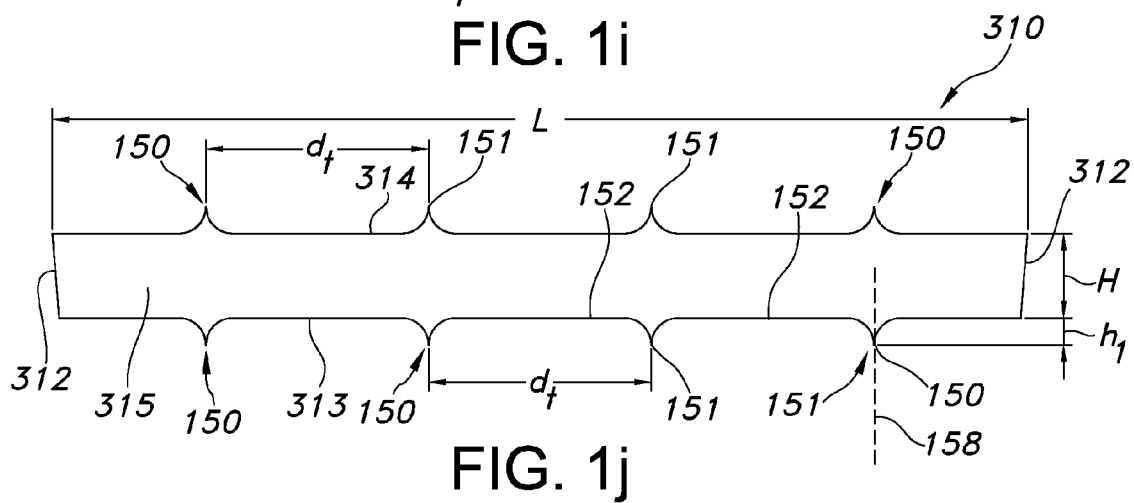

As shown in FIG. 1j, the second longitudinal edge 314 may optionally also comprise tooth structures.

FIG. 1b schematically depicts a possible cross section of the conductive strip 310, wherein the tooth structures 150 may be wedge shaped, with a ridge 159 of the wedge parallel to (first) longitudinal edge 313 and second longitudinal edge 314. Longitudinal axis 158 may be perpendicular to the ridge 159. Assuming the transverse edges 312 being parallel, and the third longitudinal edges 315 being parallel, the longitudinal axis 158 is parallel to the transverse edges 312 and third longitudinal edges 315.

FIG. 1c schematically depicts a possible cross section of the conductive strip 310, wherein the tooth structures 150 may be needle shaped. Reference 157 indicates the tooth surface. Note that this surface is curved.

Referring to FIGS. 1a-1c, the conductive strip 310 may thus have a rectangular cross-section (when not including the tooth structures 150). However, as indicated above, the conductive strip may also have other types of cross sections.

FIG. 1d further indicates the sharpness/narrowness of the tooth structures 150. Within a distance d6 from the tooth top 151, the area of the cross section, indicated with refer 154 is small, i.e. the cross-sectional area is small, such as 10 mm² or less, especially 2 mm² or less, within a distance d6 of at least 0.5 mm from the tooth top 151. Beyond this distance d6, the cross-sectional area may increase, but the first 0.5 mm the tooth top 151 is narrow. This narrow part may also be indicated as top part 153. Hence, any cross-section (perpendicular to longitudinal axis 158) within the range d6 from the tooth top may have this small cross-sectional area. This may show the sharpness of the tooth structures 150.

FIG. 1e schematically depicts a tooth structure having a pyramidal shape.

FIG. 1f schematically depicts that within distance d6 from the tooth top 151, see also above, tangents 155 to the tooth surface 157 have a tangent angle θ. Within d6, the tangent angle θ between tangents 155 are especially smaller than 135°. This may especially apply to tooth structures having a circular cross-section (at least within distance d6 from the tooth top 151). Hence, especially the tooth structures 150 have a conical shape (optionally a curved conical shape, as shown in FIGS. 1c, 1d and 1f).

FIGS. 1g-1i schematically depict some variants, with short shortest distances dt (FIG. 1g) and with relatively larger shortest distances dt (FIGS. 1h-1i). In FIGS. 1g-1h, the longitudinal edge 313 is substantially planer, except for the tooth structures 150; in FIG. 1i, the longitudinal edge 313 has curvatures, with sharp tooth structures 150.

Note that in a variant, also second longitudinal edge 314 may comprise tooth structures. This is schematically depicted in FIG. 1j. the tooth structures 150 at the second longitudinal edge will in general be subjected to the same general conditions as described above. However, the specific dimensions of the tooth structures 150 as well as their distances may be different for both longitudinal edges 313, 314. Further, this schematic drawing by way of example shows the tooth structures to be arranged opposite of each other at the longitudinal edges 313,314, with each tooth structure 150 having an opposite tooth structure 150 at the other longitudinal edge. However, the tooth structures at the longitudinal edges 313,314 may also be arranged shifted (or translated) relative to each other (with a translation unequal to an integer times dt). Note that the term shortest distance dt relates to adjacent tooth structures at the same longitudinal edge. For instance, in this schematically depicted embodiment the shortest distance between the tooth tops 151 at the first longitudinal axis may well be larger than the shortest distance between two oppositely arranged tooth tops 151 at the longitudinal edges 313,314, respectively.

Figure 2A:
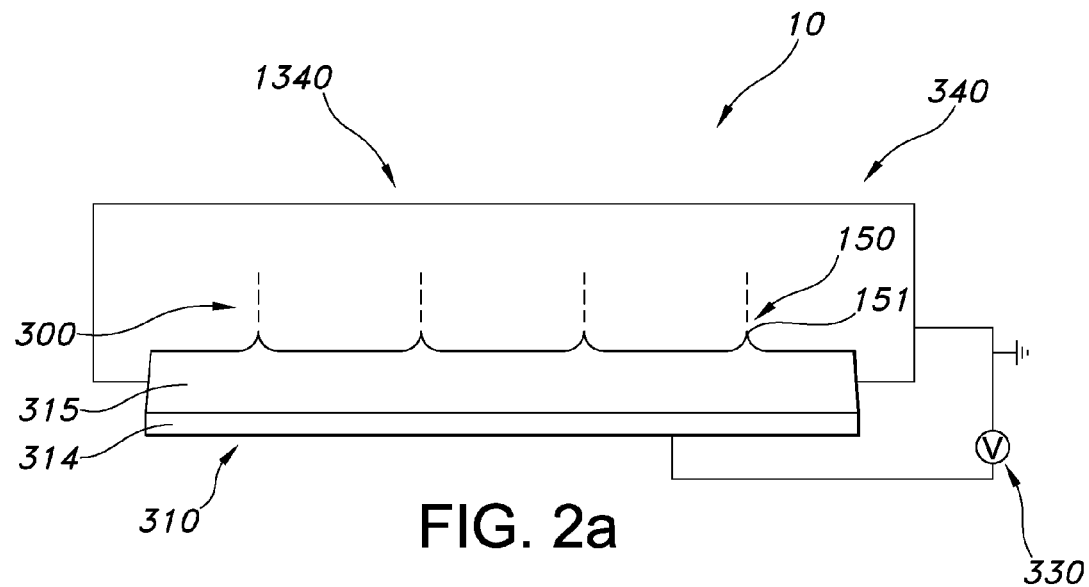
FIGS. 2a-2g schematically depict some embodiments of the gas purification system.
Figure 2B:
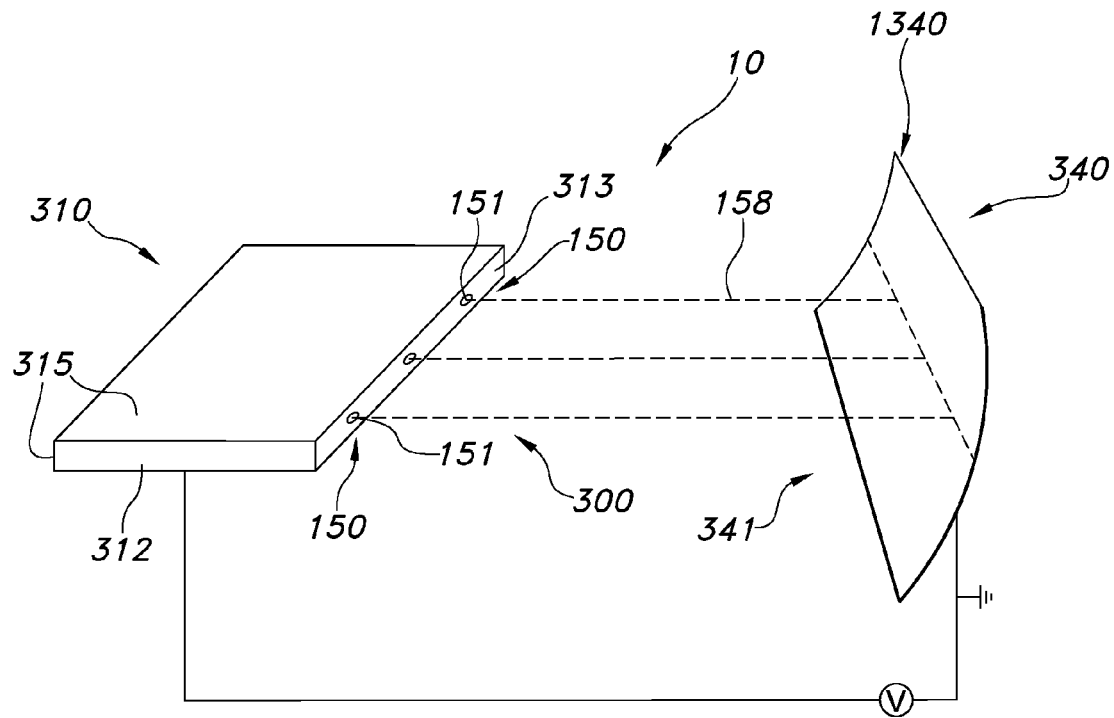

FIGS. 2a-2d schematically depict embodiments wherein the tooth structures 150 may point in a direction of the counter electrode 340. This is a preferred embodiment, though other options are also possible. As can be seen in those figures, the longitudinal axes 158 of the tooth structures, when extended, "touch" the counter electrode 340. In FIG. 2b, the counter electrode 340 comprises a concave part 341. Reference 330 refers to a voltage generator. Reference 1340 indicates that the counter electrode is a plate like counter electrode. Hence, reference 1340 indicates such plate like counter electrode, for instance a stainless steel plate (which may optionally be curved, see also below). In FIGS. 2a/2b gas, such as air, may flow between the conductive strip and the counter electrode; gas, such as air, may be lead through the gas purification system while applying a DC voltage of preferably at least 10 kV to the conductive strip 310.

Figure 2C:
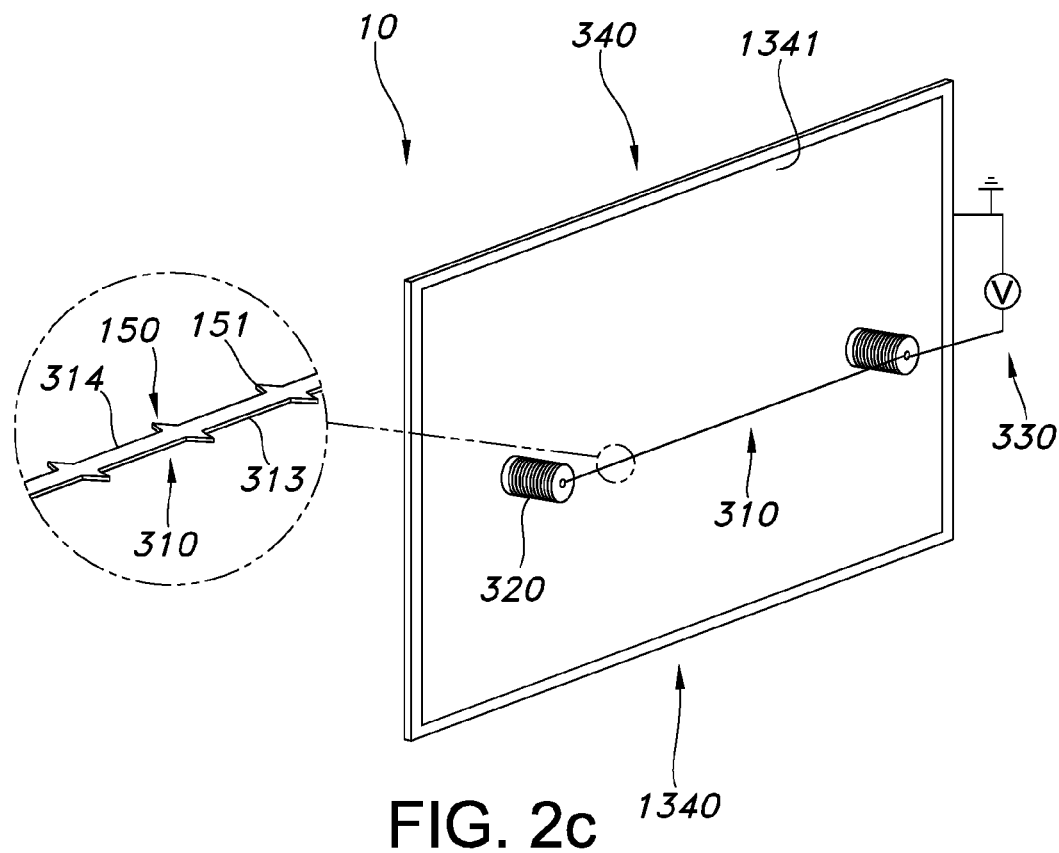
Figure 2D:
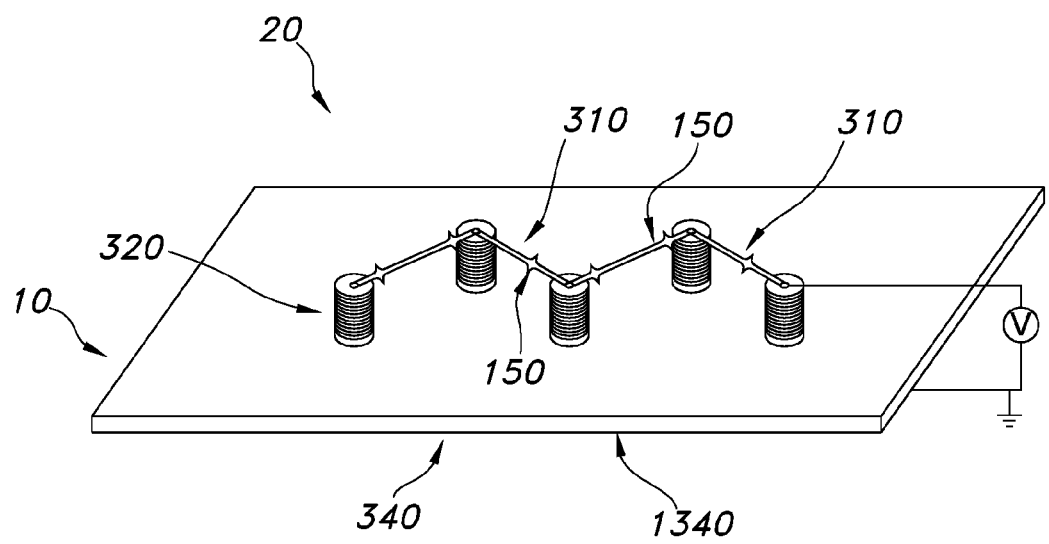

FIG. 2c schematically depicts a variant with at both longitudinal edges 313,314 tooth structures 150. The tooth structures at one of the longitudinal edges 313,314 may point to the counter electrode 340. However, in an embodiment, the tooth structures 150 of the longitudinal edge(s) do not point to the counter electrode 340. FIG. 2d schematically depicts en embodiment wherein a plurality of conductive strips 310 is applied. In this variant, the conductive strips 310 are arranged head to tail, and are in electrical connection with each other. Due to the head to tail arrangement, only one electrical connection with one conductive strip 310 is necessary. Further, by way of example one of the conductive strips 310 has tooth structures at both sides of the strips. Note that the tooth structures (of one of the longitudinal edges) may thus not necessarily all point to the (closest) counter electrode. By way of example, arrow 20 indicates a naturally occurring or induced gas flow of a gas comprising for instance fine dust particles. When applying the herein indicated voltage, the fine dust particles, etc., may be guided to the counter electrode 340 and deposit there. In this way, this relative simple configuration of the gas purification system 10 may efficiently reduce the fine dust content in air or a gas flow. In practical experiments, deposition is found on the counter electrode and relevant reductions of fine dust, etc., is observed. The plate like counter electrode 1340 comprises here a first face 1341 and a second face 1342, which are configured parallel.

FIG. 2c comprises by way of example a single conductive strip 310, whereas FIG. 2d (but see also FIGS. 4a-4f) schematically depicts the embodiment to include a plurality of conductive strips 310. In some embodiments, described herein, the corona discharge wire(s) 310 are configured parallel to the counter electrode 340. In FIG. 2d, the plurality of conductive strips 310 comprises a single subset, wherein the conductive strips 310 are configured in a zigzag or head-tail configuration. FIG. 2d (thus) schematically depicts a zigzag arrangement, wherein in this schematically depicted embodiment, the conductive strips are in electrical connection with each other (i.e. adjacent conductive strips make an electrically conductive connection).

FIGS. 2c-2g schematically depict first electrodes 310 that may be connected (but in electrical isolation) to one more counter electrodes 340 via electrical insulators 320 ("isolators"), such as bushings.

In FIGS. 2c/2c gas, such as air, may flow between the conductive strip and the counter electrode; gas, such as air, may be lead through (or over) the gas purification system while applying a DC voltage of preferably at least 10 kV to the conductive strip 310.

Figure 2E:
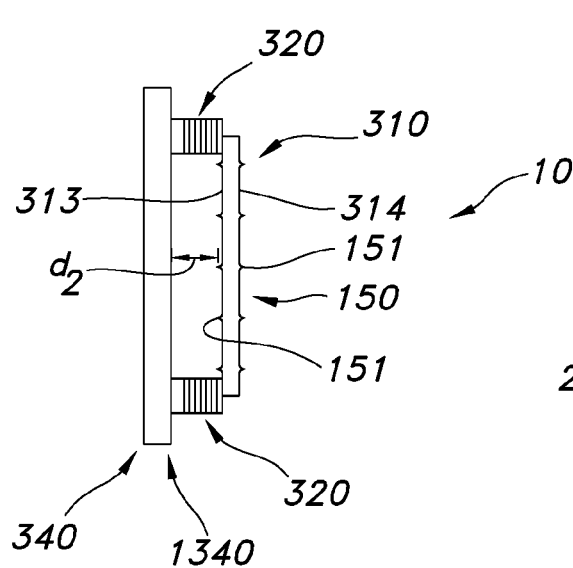

FIG. 2e schematically depicts basically the same arrangement as in FIG. 2c, but now in a side view.

Figure 2F:
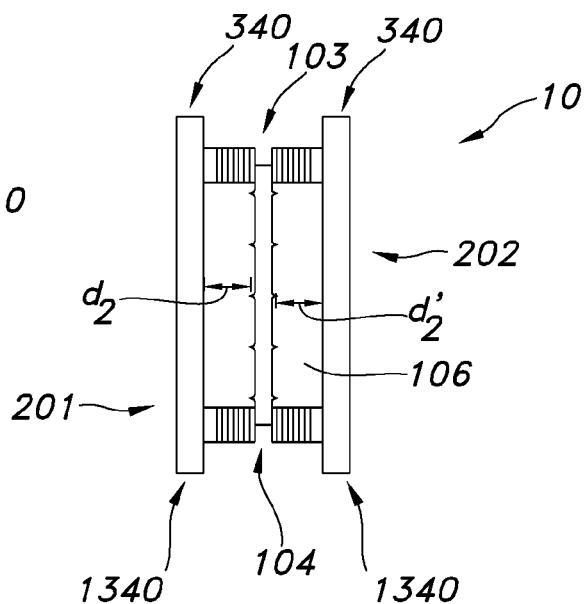
Figure 2G:
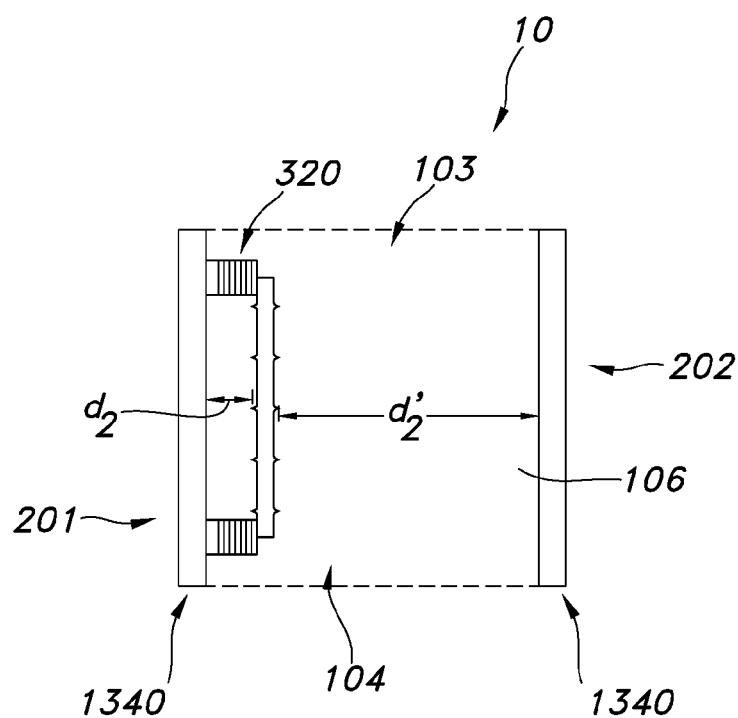

FIGS. 2f and 2g schematically depicts an embodiment of the gas purification system 10 with two counter electrodes 340 and the conductive strip 310 arranged in between. The distance of the tooth tops 150 to the other counter electrode (or second counter electrode), is indicated with reference d2'. The value of d2' may be same as d2 (FIG. 2f) or may be different (FIG. 2g). The space or volume between the counter electrodes is indicated with reference 106 (internal channel).

The gas purification system 10 shown in FIGS. 2f and 2g may be part of an elongated gas channel. Hence, by way of example, the conductive counter electrodes are comprised by first and second walls 201,202, respectively, and also dashed lines indicated the optional edge walls 103,104. The term "comprised by the wall" and similar terms may refer to the fact that the wall may function as counter electrode, a wall may have a counter electrode arranged to it, etc. The counter electrode in FIG. 2g at the right side may optionally be a movable counter electrode, such as (a part of a) conveyor belt (see also below).

Figure 3A:
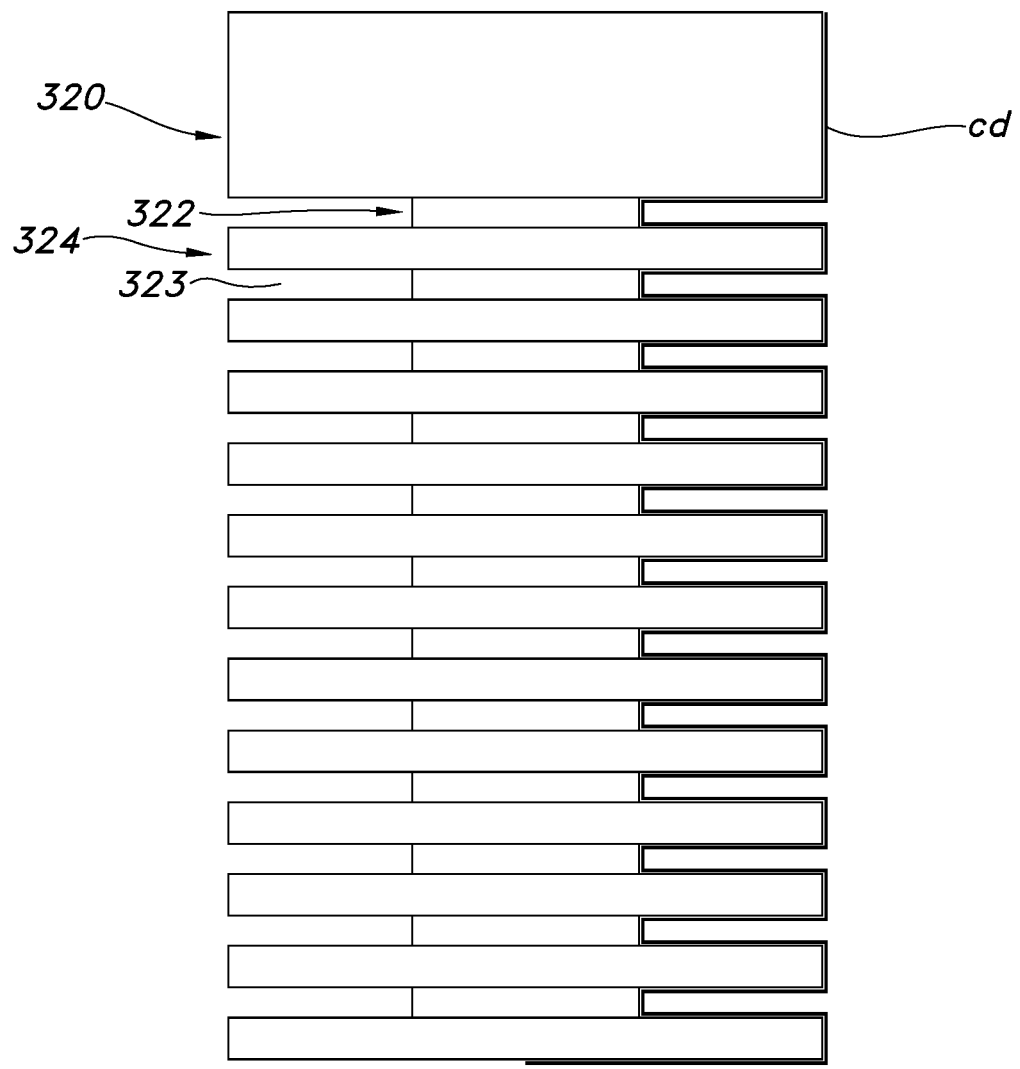
FIG. 3a-3c schematically depicts some embodiments of possible isolators, such as bushings.
Figure 3B:
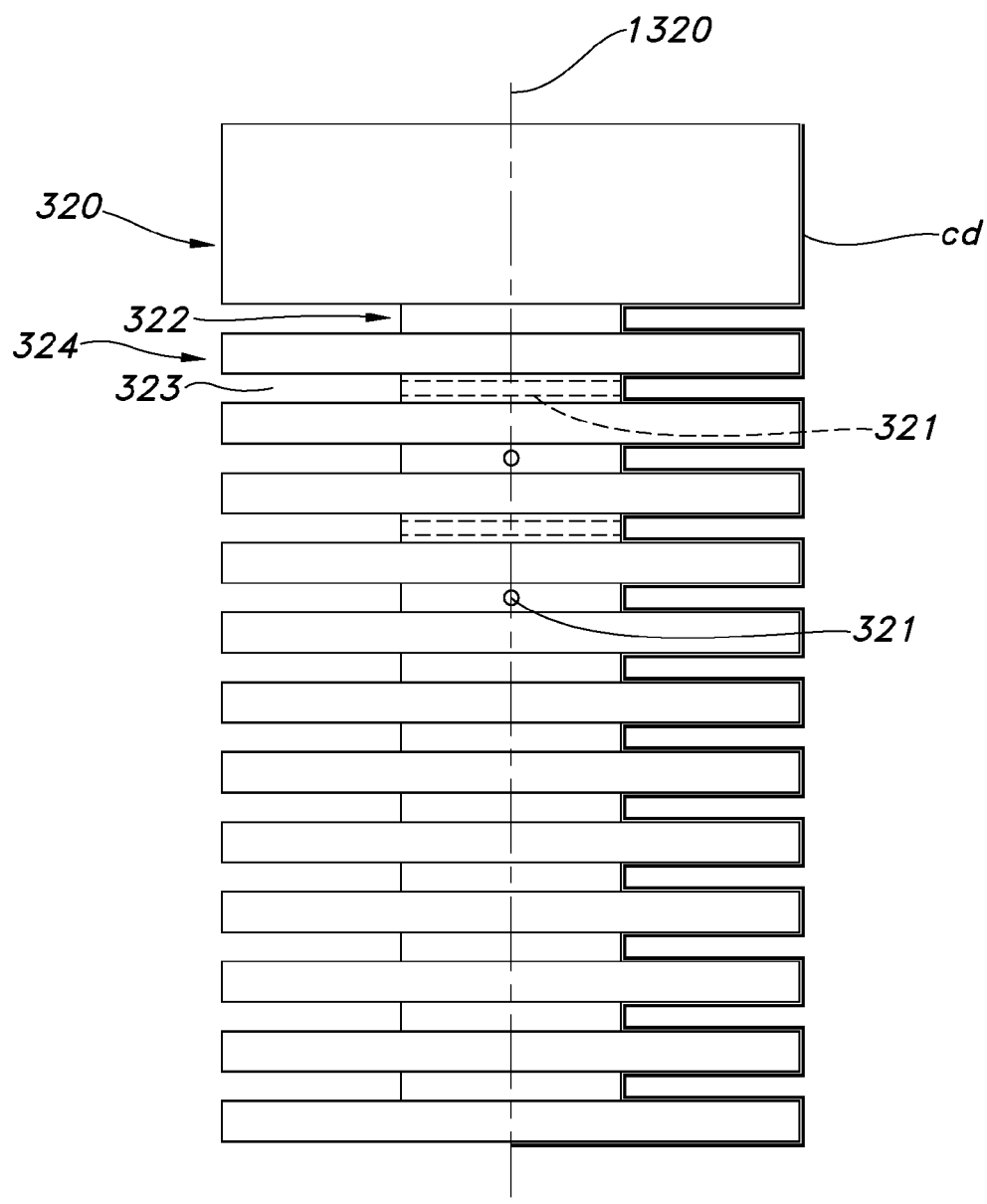
Figure 3C:
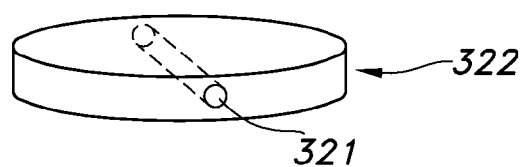

FIG. 3a-3c schematically depict embodiments and variations thereof of possible isolator, such as a bushing 320. The isolators, such as in FIGS. 3a-3b have creeping distances cd. The isolator, such as a bushing, comprises alternatingly arranged resided parts 322 and extended parts 324. In general, these are disk like structures, of disks having larger and smaller radii, especially all having a circle centre at a longitudinal axis 1320 of the isolator, such as a bushing. Between two adjacent extending parts, the resided part arranged in between those two adjacent extending parts results in a cavity between the two extending parts, as the residing part extends less than the extending parts. As within the cavity fouling may occur, one or more residing parts may comprise through holes 321 (see FIGS. 3b-3c). This may facilitate also gas flow through the cavities and thus reduction of fouling. These openings can be considered a kind of natural purge channels. One residing part may comprise one or more through channels which may optionally not be interconnected. The through holes in general have a longitudinal axis 1321 are arranged in the plane of the residing part. Especially, the longitudinal axis 1321 of the through hole is preferably arranged perpendicular to the longitudinal axis 1320 of the isolator, such as a bushing 320. One or more of the residing parts 322 may independently comprise one or more through holes 321. FIG. 3b schematically depicts a variant with by way of example a few of residing disks 322 having through holes. However, also all residing disks 322 may have through holes, and the arrangement of the through holes 321 may be different from depicted in the schematic drawing 3b.

FIGS. 4a-4f schematically depicts an embodiment of the gas purification system of the invention, and variant(s) thereon. The gas purification system is indicated with reference 10 and comprises an elongated gas channel 100, a gas transport unit 200, and a corona discharge system 300.

The schematic drawing 4a is a cross-sectional view in the length direction of the elongated gas channel 100 ("side view"); FIG. 4b is a cross-sectional view in the plane of the elongated gas channel 100 ("top view"); FIG. 4c is a front view of the elongated gas channel 100.

The elongated gas channel 100 has a first face 101 (which may also be indicated as top face), a second face 102 (which may also be indicated as bottom face) opposite of the first face 101, and edges (or edge faces) 110. The elongated gas channel 100 further has a rectangular cross-section 105. The two opposite edges 110 are further indicated with references 110a and 110b, respectively. The elongated gas channel 100 has a channel height h1 ("height" h1) and a longitudinal axis 1. The height h1 of the channel may for instance be in the range of 0.1-2 m, such as 0.2-1 m. The elongated gas channel 100 has a channel inlet 103, for introduction of gas 20, and a channel outlet 104, for exhaust of purified gas 21. The length, indicated with reference 11, of the elongated gas channel 100 between the channel inlet 103 and channel outlet 104 may for instance be in the range of 0.2-100 m, like 0.5-20 m, even more especially at least 1 m.

The walls are indicates as first wall 201, which has the first surface 101, second wall 202, which has the second surface 102, and edge walls 210, with the edges or edge surfaces 110. The first surface, the edge surfaces 110 and the second surface 102 enclose the channel internal or channel volume 106.

First wall 201, the second wall 202, and the edge walls 210 are preferably of a low or non-conductive material. Relative to the counter electrode, their conductivity is preferably at least 1000 times lower, or even at least 100.000 lower. Of course, in embodiments where the second face 102 includes the counter electrode 340, the conductivity of at least part of the second wall is high, as it should be electrical conductive.

As indicated above, the gas purification system 10 further comprises gas transport unit 200. The gas transport unit 200 is configured to transport gas 20 through the elongated gas channel 100. The gas transport unit may be a fan, a rotator, a ventilator, a pump, etc.

As indicated above, the gas purification system 10 further comprises corona discharge system 300. This corona discharge system comprises a counter electrode 340 within the elongated gas channel 100, i.e. at least partly, but in general entirely, configured within the internal 106 of the elongated gas channel. The counter electrode 340 is configured at a distance from the first face 101. The counter electrode 340 has a counter electrode distance d3 to the first face 101, with in this schematically depicted embodiment ½h1<d3≤h1. Hence, when seen from the first face 101, the counter electrode is beyond the middle of the elongated gas channel 100 ("behind the longitudinal axis"). The counter electrode is thus, in an embodiment, closer to the second surface 102 than the first surface 101.

In an embodiment, not depicted, the second surface 102 may comprise the counter electrode 340. In another embodiment, not depicted, the counter electrode 340 may form the second surface 102. Therefore, d3 may also be equal to h1.

The distance between the counter electrode 340 and the first surface 102 is indicated with reference d4. This distance may be a few millimetres, although, as indicted in the previous paragraph, d4 may also be zero when the second surface 102 comprises the counter electrode 340 or the counter electrode 340 form the second surface 102.

The gas purification system 10, or more precisely the corona discharge system 300, further comprises conductive strip 310 within the elongated gas channel 100. The conductive strip 310 has a first distance d1 to the first face 101 and a second distance d2, measured from the tooth top 150, to the counter electrode 304.

Like the counter electrode 340, the conductive strip 310 is preferably arranged beyond the longitudinal axis, when seen from the first surface 101. Hence, for the conductive strip applies in this schematically depicted embodiment ½h1<d1<h1. Of course, d1≠h1, because otherwise the conductive strip 310 would be in physical contact with the second surface 102. Further, for the conductive strip 310 applies d1/d2>1. Hence, the conductive strip 310 is closer to the counter electrode 340 than to the first surface 101. Therefore, in a specific embodiment the distances from the conductive strip (310) to each of the first face (101) and the edges (or edge faces) are larger than the second distance to the counter electrode (340). Especially such configuration appears to provide good purification results.

Preferably, the conductive strip 310 is configured parallel to the first face 101, the second face 102, and the edges 105. In other words, the conductive strip 310 is configured parallel to the longitudinal axis 1.

The gas purification system 10, or more precisely the corona discharge system 300, further comprises a voltage generator 330, especially configured to apply a DC voltage of at least 10 kV to the conductive strip 310. Good results were obtained with a thickness (w) of the conductive strip 310 of about 0.3 mm and a voltage applied in the range of 20-35 kV.

Figure 4A:
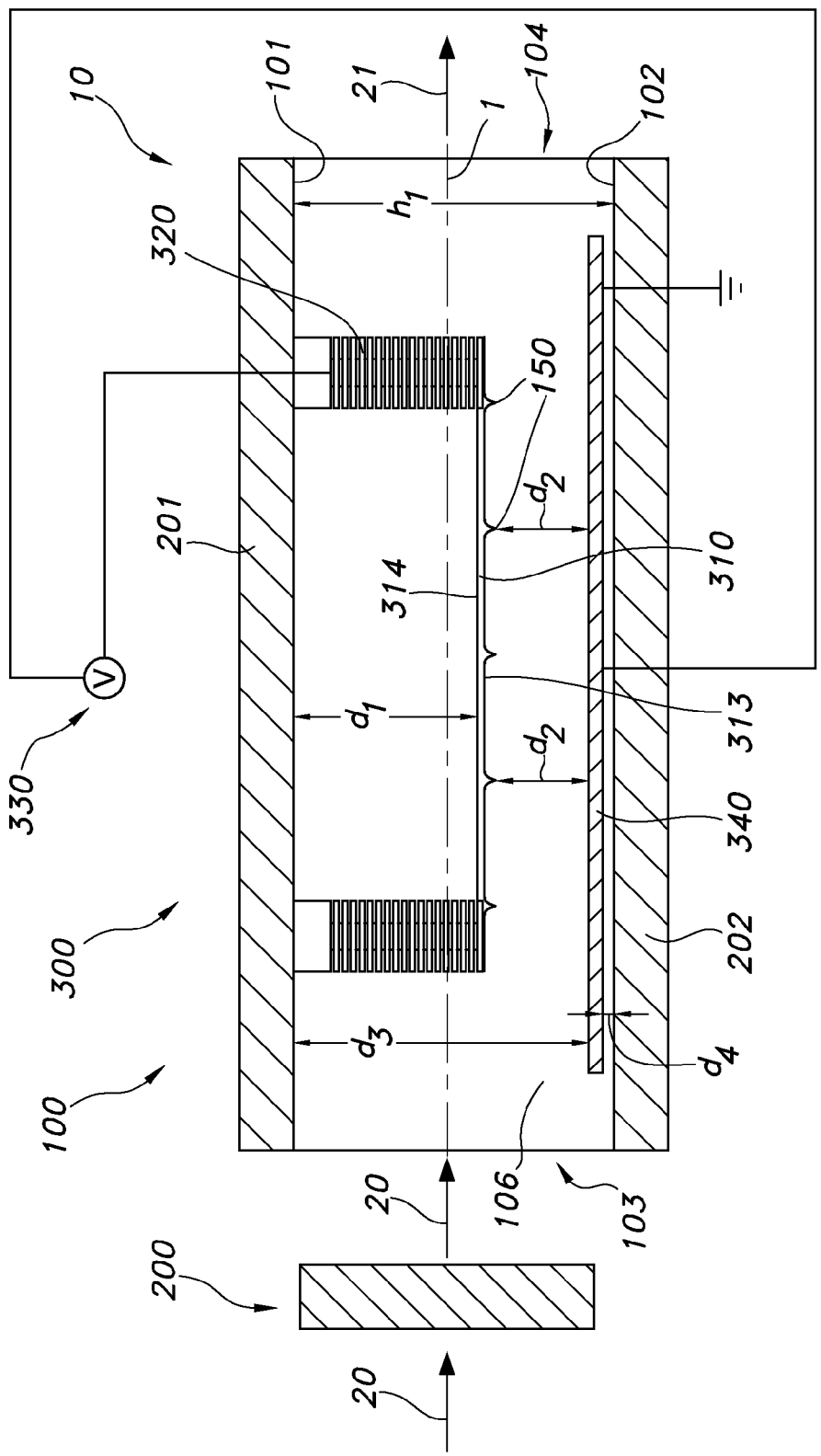
FIGS. 4a-4f schematically depicts some embodiment and variants thereon of the gas purification system of the invention.
Figure 4B:
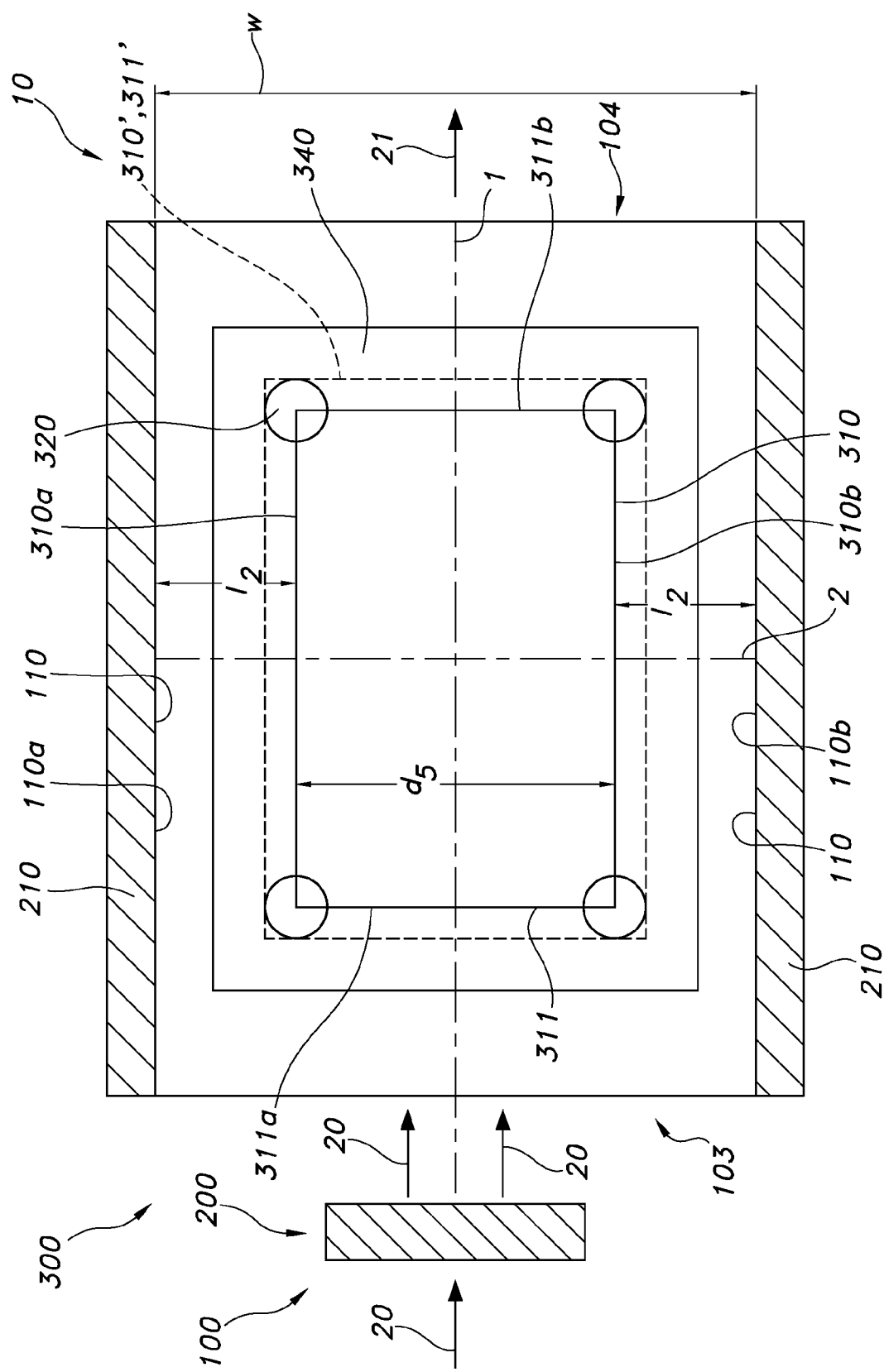
Figure 4C:
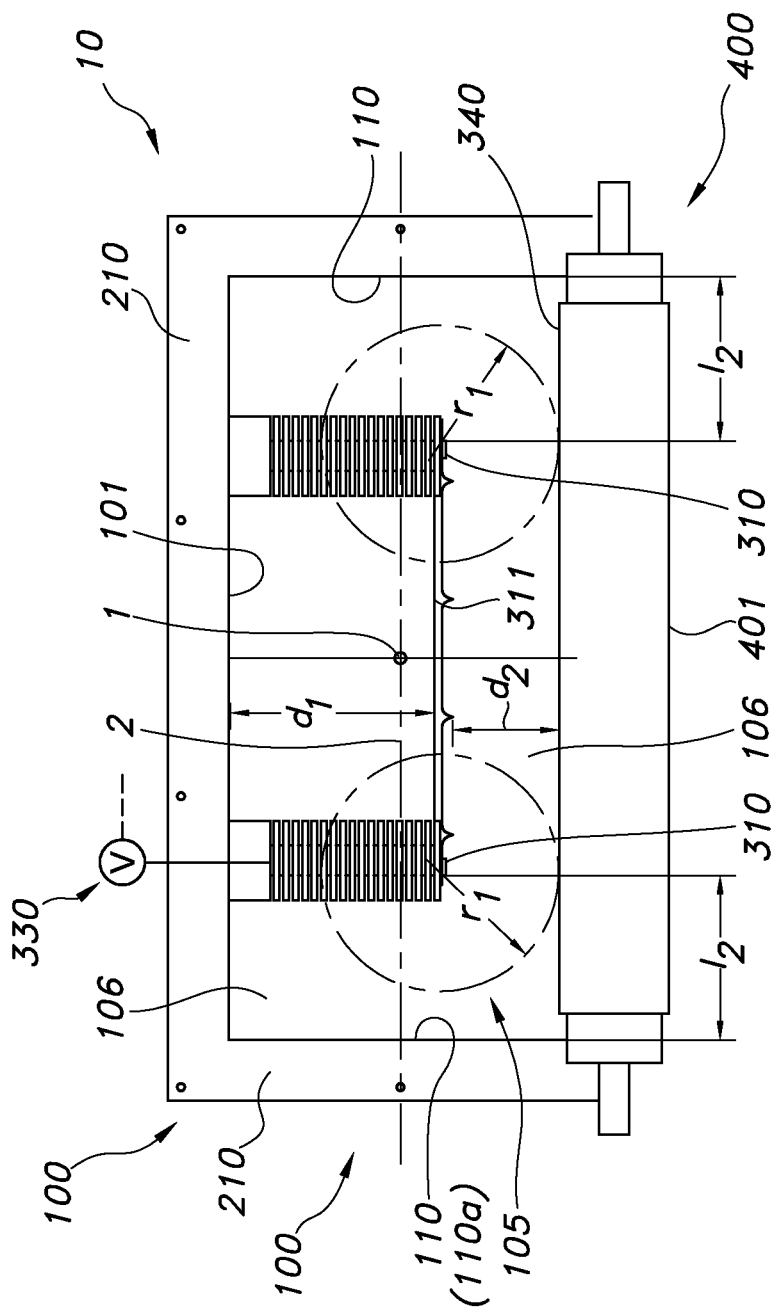

In FIG. 4a, the counter electrode 340 may be a plate like counter electrode (which is further below also indicated with reference 1340). This plate-like electrode comprises here a first face and a second face, which are (in general) configured parallel. See also FIGS. 2b (curved), 2c, 2d, 2e, 2f, 2g, wherein the counter electrodes may be conductive plates. However, in specific embodiments, also wire meshes etc. may be applied as counter electrode.

FIG. 4b schematically depicts the same embodiment, but now in cross-sectional top view. Note that in fact two conductive strips 310 are applied, both parallel with the longitudinal axis 1, which are connected with connecting wires 311. Those connecting wires 311 are optional. Instead of connecting wires 311, also conductive strips may be applied, see also FIG. 4c-4e. FIG. 4b schematically depicts also a variant, with dashed lines, wherein the conductive strip 310 is an endless strip, surrounding two or more (in this schematically depicted embodiment 4) bushings 320. This endless conductive strip with tooth structures is indicated with reference 310',311'. Hence, in an embodiment, the conductive strip with tooth structures is an endless strip, preferably surrounding the two or more isolators, such as. The creeping distance(s) is(are) of course calculated from the conductive strip.

As will be clear to the person skilled in the art, alternatively only one conductive strip 310 may be applied, or more than 2 conductive strips 310 may be applied. Especially, the distance d5 between the conductive strips is at least 20 cm (as indicated above, the mutual smallest distance between two parallel arranged conductive strips is preferably at least 200 mm), more especially at least 30 cm, even more especially at least 40 cm. The edge walls 210 have edge faces, which are respectively indicated with first edge face 110a and second edge face 110b. The distance between the edge faces (i.e. 110a and 110b) is indicated with width w. Hence, per 20 cm width or more, a conductive strip 310 may be applied. Further, more than one conductive strip 310 may be arranged behind one another, for instance when the elongated gas channel 100 is long. The length l1 of the channel may for instance be in the range of 1-50 m. For instance, in such channel 20 conductive strips 310 may be arranged between one another, with longitudinal distance between one another of for instance at least 20 cm, such as at least 40 cm (especially also equal to d5).

In FIG. 4b, reference 2 indicates the centre line of the elongated gas channel 100. Reference 12 indicates the distance from the conductive strip 310 to the edge surface of the (nearest) edge 110. Preferably, l2>d2, although other configurations may be possible as well.

FIG. 4b schematically depicts an embodiment wherein the conductive strips 310 are connected via connecting wires 311 (which are also electrically conductive). When the method of the invention further comprise applying an electric current of at least 5 µA, such as at least 8 µA, more especially at least 10 µA, per meter conductive strip 310, and conductive strips are connected with connecting wire, the length in meters of the entire conductive circuit should be used as length. Hence, the invention in this embodiment might also include Hence, applying an electric current of at least 5 µA, such as at least 8 µA, more especially at least 10 µA, per meter conductive strip 310 (in this embodiment the length in meters of first conductive strip 310a, and second conductive strip 310b). FIG. 4b, and also FIG. 4e, embodiments wherein the conductive 310 strip(s) is (are) configured parallel to the edge faces (i.e. 110a and 110b).

FIG. 4c schematically depicts another cross-sectional view. From this drawing can be seen that the elongated gas channel 100 has a rectangular cross-section. Here, the cross-section perpendicular to the longitudinal axis 1 is meant. This figures shows that the distance from the conductive strip 310 to the closest edge face 110, indicated with 12, is longer than d2. Also the distance d1 of the conductive strip 310 to the first face 101 is longer than d2. This is also shown by depicting radius r1. Especially, when the radius r1=d2, preferably no other items of the gas transport unit (other than the optional connection wire and an insulator 320), are present within that radius, but are more remote than r1 (=d2).

FIG. 4c also schematically depicts a specific variant, wherein an endless conveyor belt 400 is applied. The conveyor belt 400 comprises a belt 401. The conveyor belt 400 is configured to run the belt 401, or at least part of it, through the elongated gas channel 100. Further, the belt 401 is configured as counter electrode 340 or comprises the counter electrode 340. A conveyor belt (or belt conveyor) in general consists of two or more pulleys, with a continuous loop of material (the "belt") that rotates about them. The term "endless" is used in order to indicate that the belt is in a continuous loop or rotation (around two or more pulleys). For instance, the belt 401 may comprise stainless steel parts.

Figure 4D:
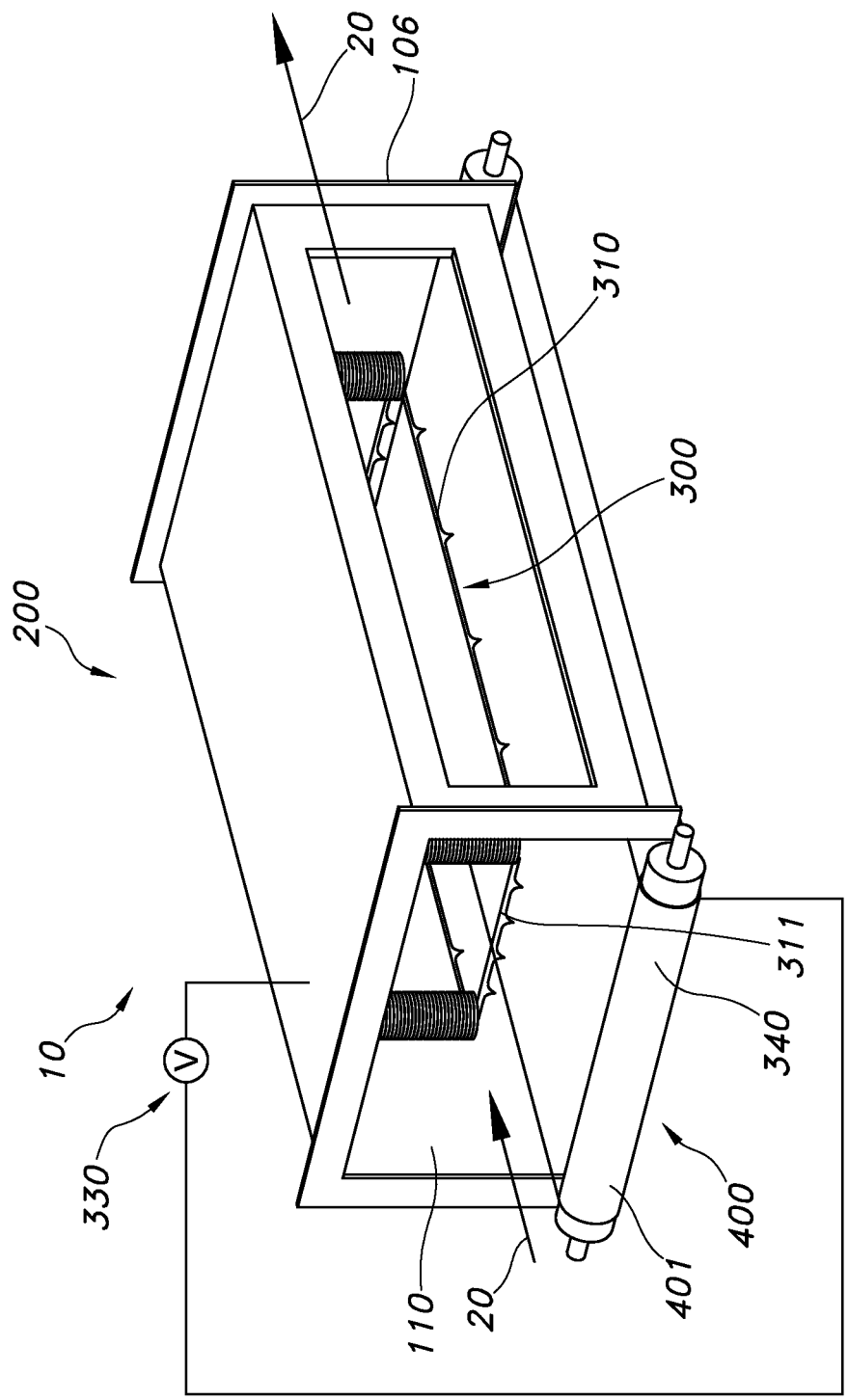

FIG. 4d schematically depicts a 3D view of an embodiment of the elongated gas channel 100, again with conveyor belt 400. The conveyor belt 400 is configured to have the upper part of the belt 401 run within the elongated gas channel 100 and the lower part of the belt 401 run outside the elongated gas channel. Find dust and/or other particles, like germs, that deposit on the counter electrode, comprises by the belt 401, thus also leaves the elongated gas channel 100 and can be removed from the belt 401 outside the elongated gas channel 100. In a specific embodiment, the conveyor belt 400 may be configured to run its belt 401 within the elongated gas channel counter current with the gas flow. This may add to turbulence. Turbulence is desired, in order to maximize deposition of particles, such as fine dust and/or germs.

Note that in FIG. 4a-4f a number of conductive strips 310 are applied, with two being arranged parallel to the edge walls 210 and two being arranged perpendicular to the edge walls 210. The 4 schematically depicted conductive strips 310 may be in physical connection with each other, or may otherwise be electrically connected to each other.

Figure 4E:
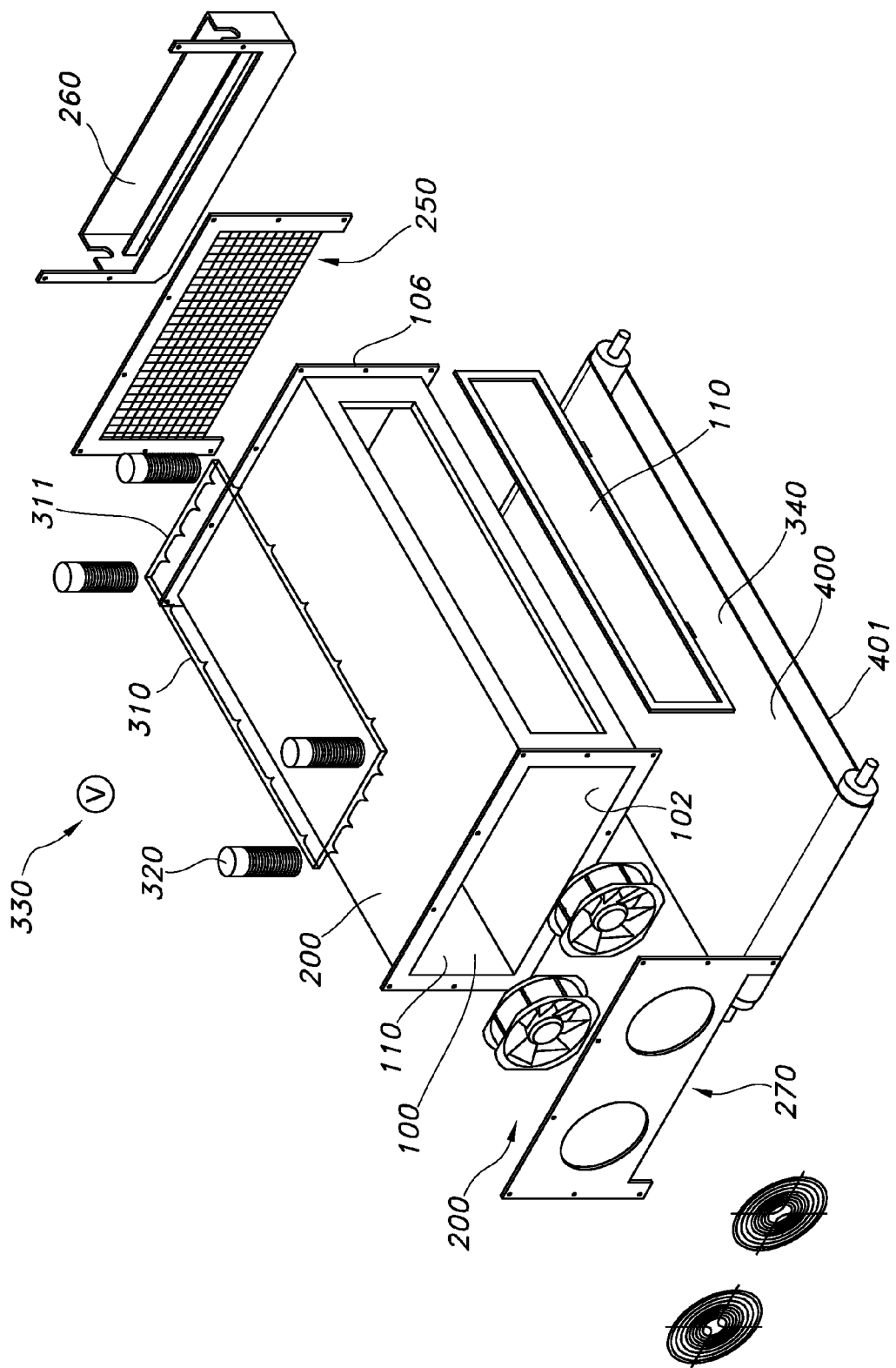

FIG. 4e schematically depicts arts of the gas purification system 10. Reference 250 refers to a wire grid that may be applied at the outlet 104, for instance for protection. Reference 260 refers to a receiver part, that may receive deposited particles that are scraped of the belt 401, and reference 270 refers to a front plate.

Other type of elongated gas channels 100 may however also be applied, like round (cross-sectional) or oval (cross-sectional gas channels). Preferably, the distance between the conductive strip and the counter electrode is shorter than the distance between the conductive strip and any other electrically conductive or earthed element.

Figure 4F:
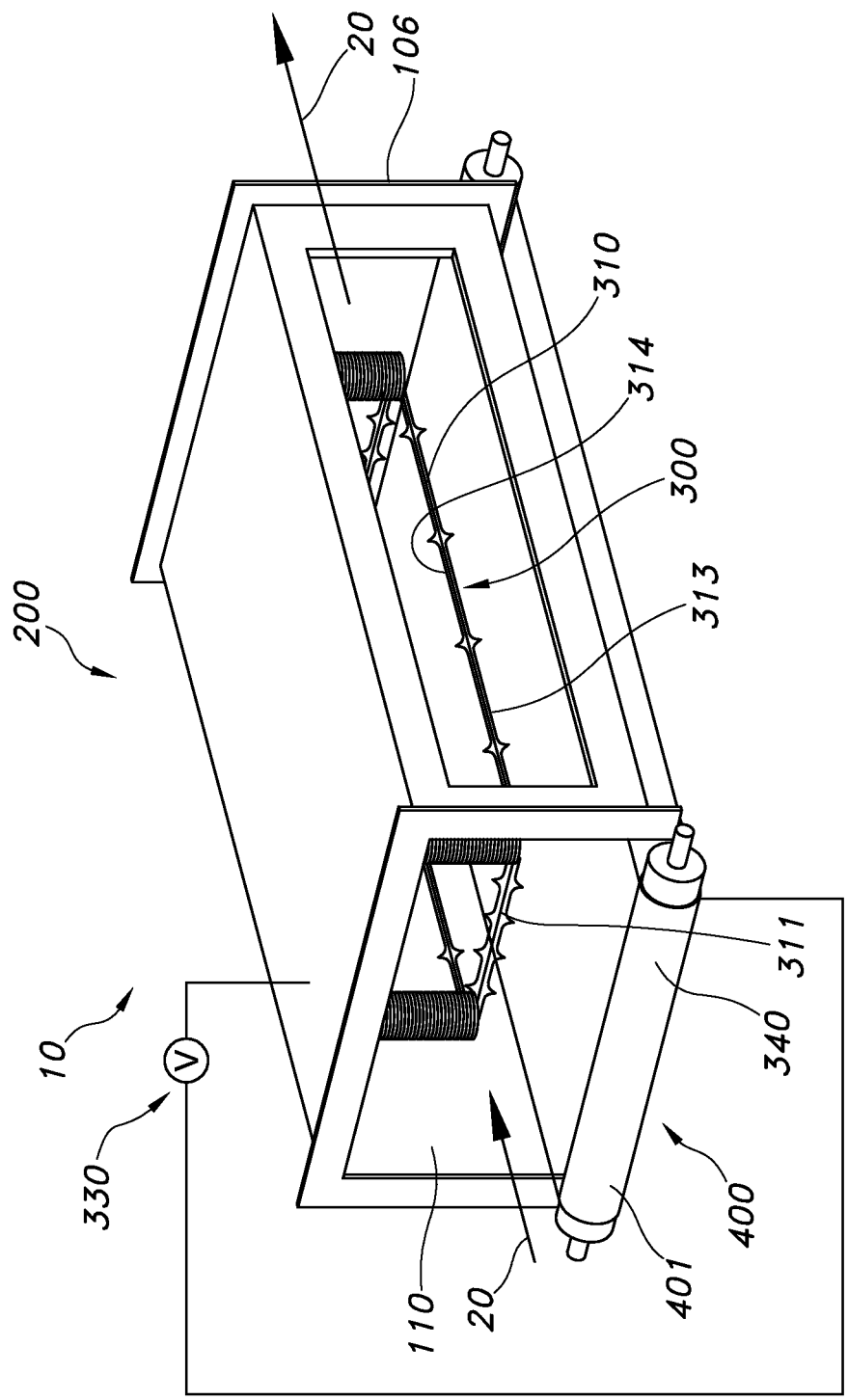

FIG. 4f schematically depicts a variant which is substantially the same as the above gas purification system(s), however in this case a conductive strip 310 with at both longitudinal edges 313,314 tooth structures 150.

Note that in above embodiments the tooth structures 150 are not necessarily all the same for each part of the conductive strip(s) 310. Further, one or more of the tooth structures may point in other directions than schematically depicted.

Figure 5D:
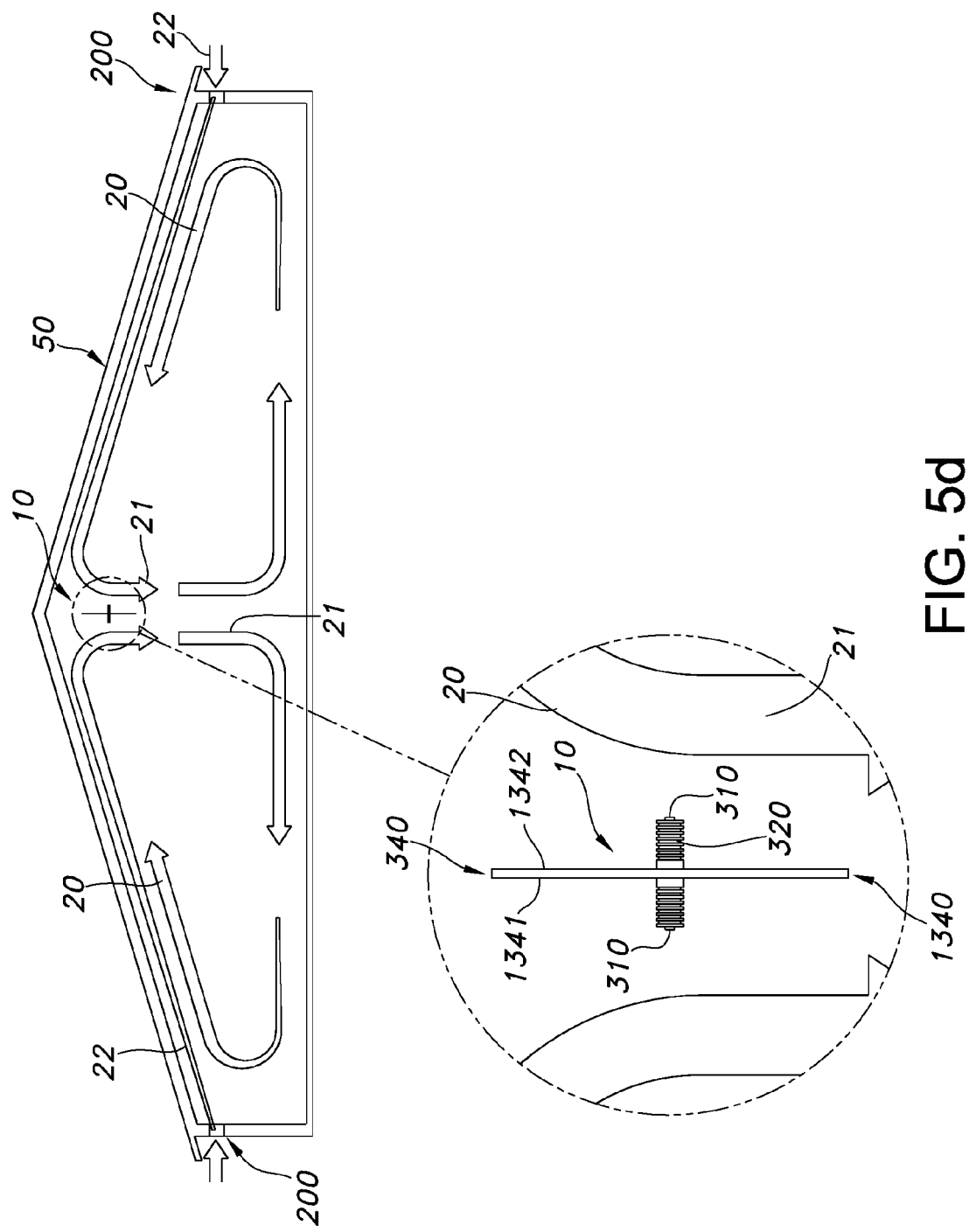

FIGS. 5a-5d schematically depict embodiments wherein an accommodation 50 is equipped with the gas purification system 10 of the invention. For instance, gas, such as air, from the accommodation may be exhausted from the accommodation 50 via the gas purification system. Purified gas 21 may then be exhausted (FIG. 5a). However, the gas purification system 10 may also be applied to purify the gas 20 from the accommodation, and return purified gas 21 back into the accommodation 50. FIG. 5e schematically depicts an embodiment of accommodation 50 including the gas purification system 10 for for instance cleaning air.

FIG. 5c schematically depict an application of the gas purification system 10, including a gas return 15. In this way, the purification may even be increased. The return 15 can be used to circulate at least part of the purified gas back into the gas purification system 10.

FIG. 5d shows a further embodiment of an accommodation 50, which may be a garage, but which may also be a shed. Here, under the ridge of the roof, the gas purification system 10 is arranged. Due to natural convection, or due to ventilation, the gas within the accommodation passes along the gas purification system 10, and particles like dust, etc. may deposit at the counter electrode 340.

Note that in this example, again a gas purification system is applied with a counter electrode 340 between two electrodes 310. Here, the counter electrode 340 is again a plate 1340, with two (oppositely arranged) faces 1341 and 1342, respectively. Deposition will be formed at those faces during operation of the gas purification system 10. The electrodes 310 may each individually be strips with tooth structures, either at one longitudinal edge or at both longitudinal edges.

Further, in this schematically depicted embodiment, optionally one or more gas transport units 200 may be applied. In this way, fresh air 22 may be introduced and a gas flow within the accommodation may be generated. The gas flow is indicated with the arrows.

Figure 5F:
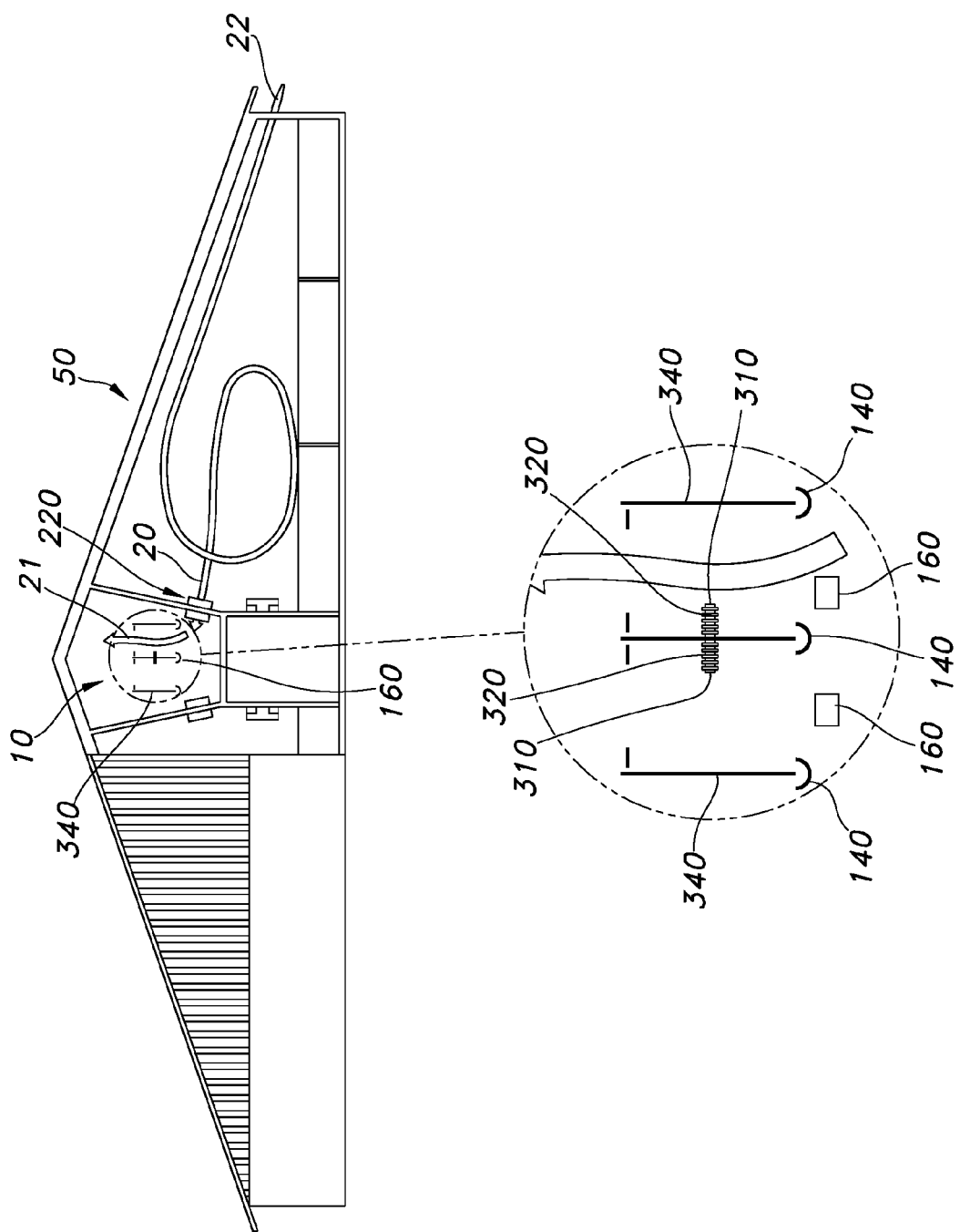

FIGS. 5e and 5f schematically depict some further embodiments. FIG. 5e shows an embodiment wherein the gas purification system may be connected as unit to the accommodation 50, similar to the schematic drawing 5a. FIG. 5f is similar to FIG. 5d, however with some further variants. Here, additional counter electrodes 340 are arranged, sandwiching the centrally arranged combination of counter electrode 340 and conductive strips 310 at both sides of the centrally arranged counter electrode 340. Now, deposition may form at all three counter electrodes. In general, all counter electrodes have the same potential, during operation of the system, and are preferably grounded.

Both FIGS. 5e and 5f further schematically depict a further variant, including a (optional) humidifier or liquid atomizer 160. Such optional humidifier or liquid atomizer 160, which may also be indicated as nebulizer, is configured to generate a haze of liquid droplets, especially a haze of an aqueous liquid. This may be used to scavenge (solve) possible gasses, especially ammonia in accommodations wherein animals reside. Due to the electrical field during operation of the gas purification system 10, droplets deposit at the counter electrode(s) 340. Hence, at a lower end of the counter electrode(s) 340, a means may be arranged to collect liquid, such as gutter(s) 140. Note that the liquid may contain also particles, such as dust particles.

Figure 6B:
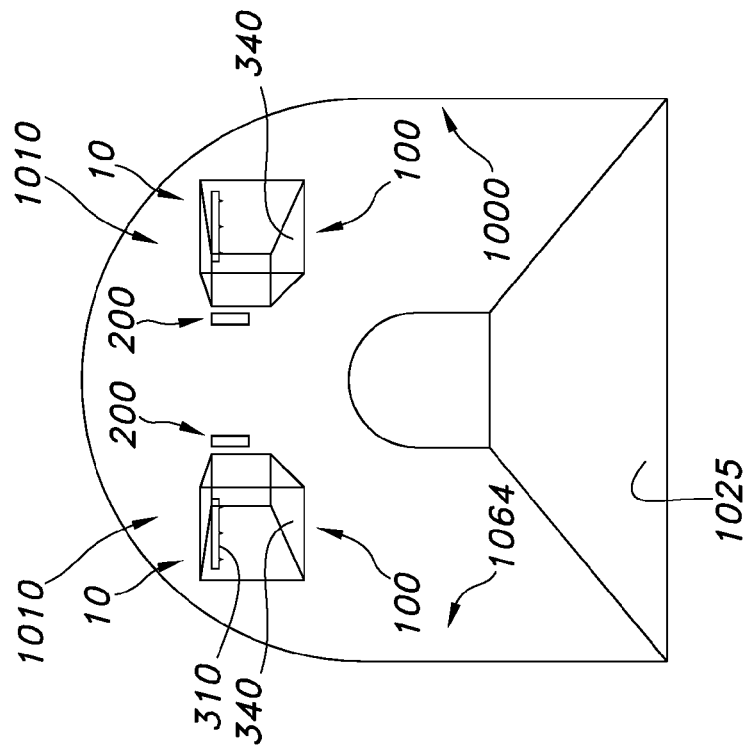
FIGS. 6a-6c schematically depict some further applications of the gas purification system.
Figure 6A:
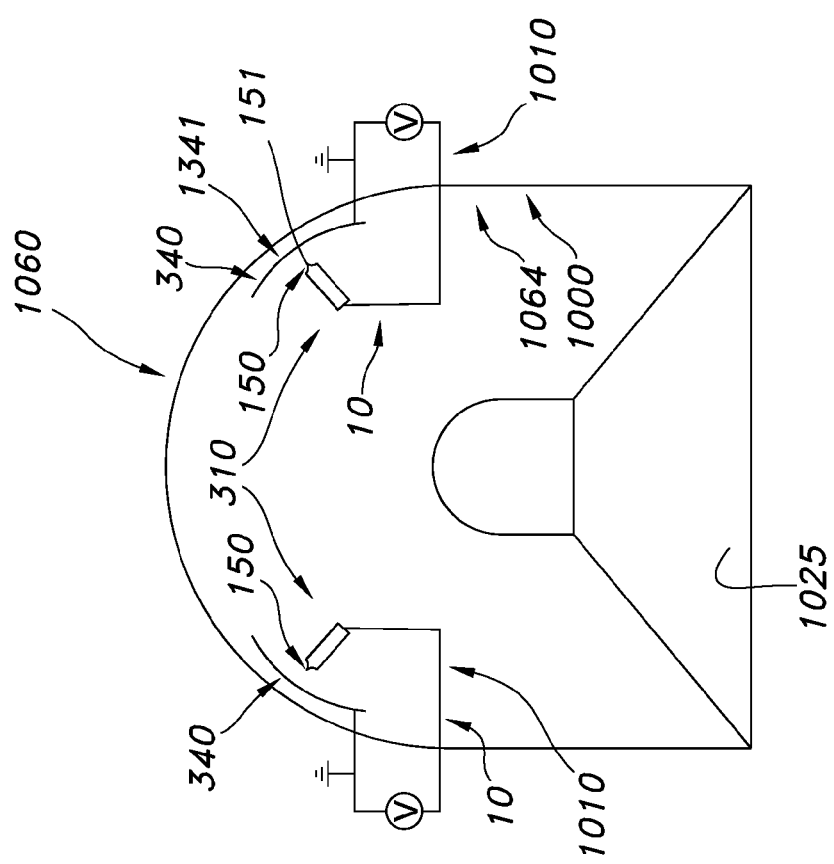
Figure 6C:
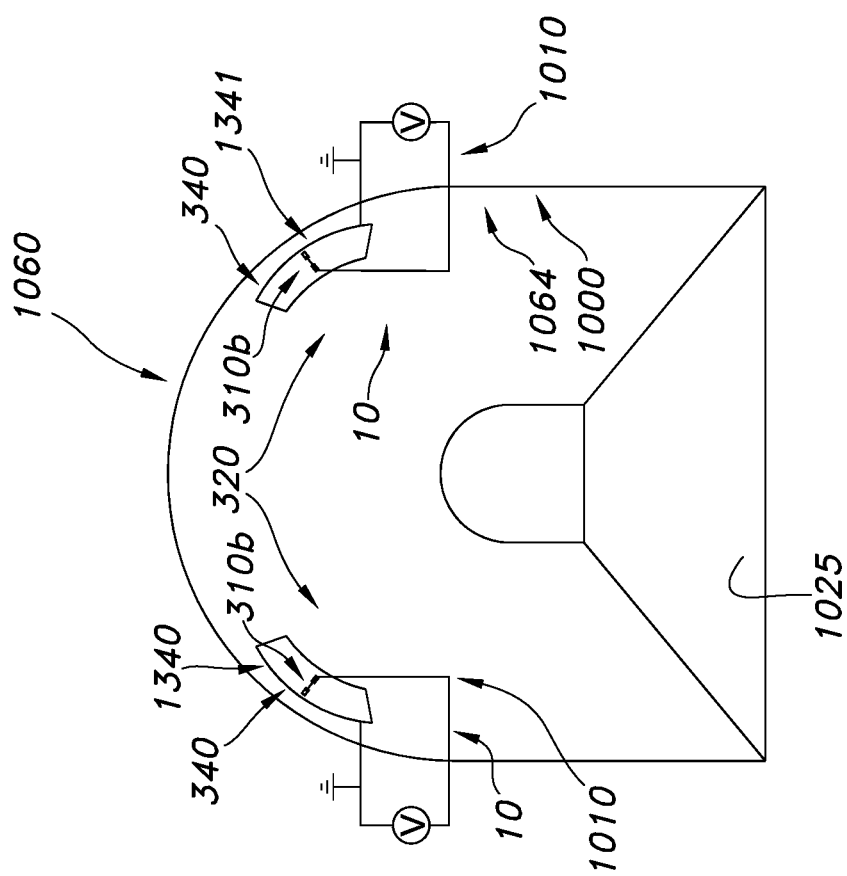

FIGS. 6a-6c schematically depict a particle catch arrangement 1010, comprising the gas purification system 10, wherein part of the gas purification system may be integrated in street furniture 1000. In those drawings, a tunnel 1060 with tunnel wall 1064 is shown, as well as a road 1025 through the tunnel 1060. For instance, the gas purification system 10, especially the counter electrode, may be attached to the tunnel wall 1064, see FIG. 6a. FIG. 6b schematically depicts an embodiment, wherein the unit as depicted in FIGS. 4a-4e or 7a are applied.

FIG. 6 schematically depicts the same variant as depicted in FIG. 6a, however now with the configuration as schematically depicted in FIG. 2c, i.e. the conductive strip 310 attached to the counter electrode 340 (but in electrical isolation thereof). Further, here in contrast to FIG. 2c, the counter electrode 340 is curved (like FIG. 2b).

Figure 7A:
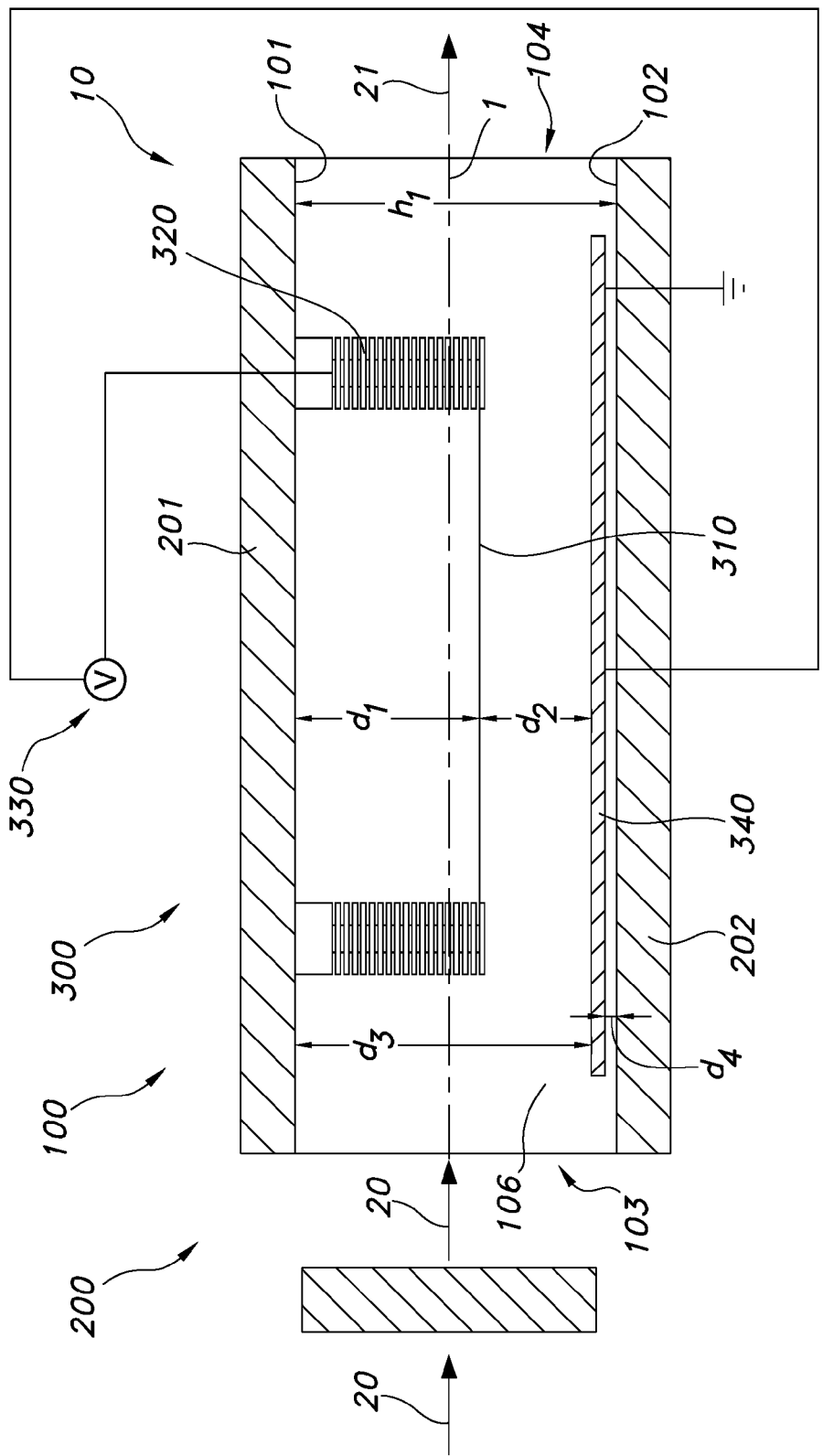
FIGS. 7a-7d schematically depict some further variants.
Figure 7C:
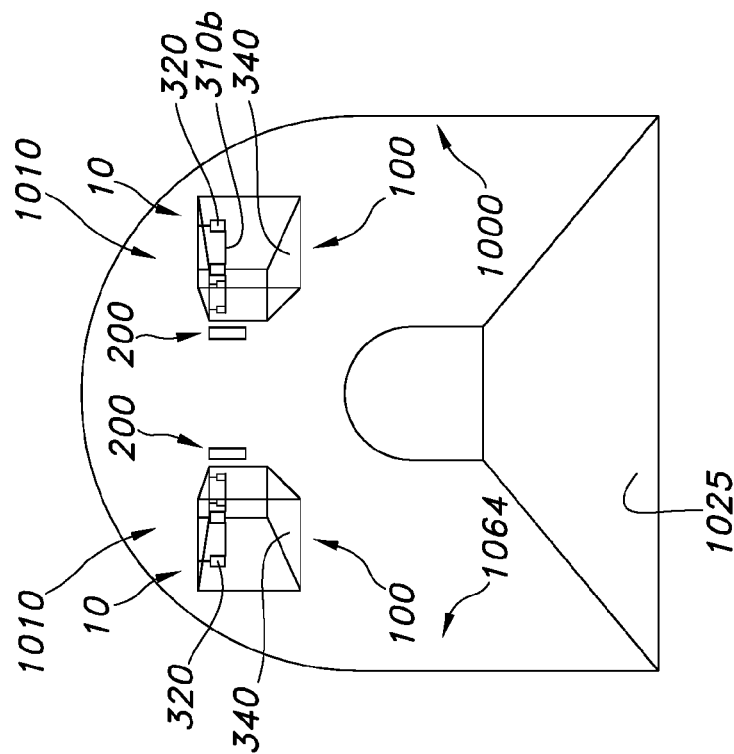
Figure 7B:
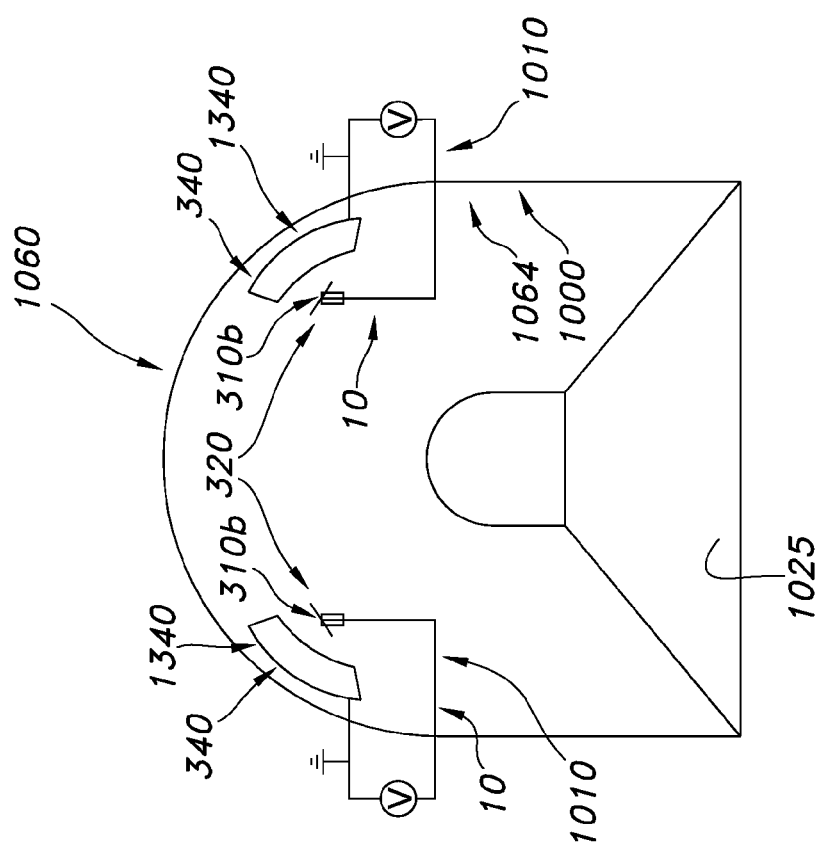

FIG. 7a schematically depicts an embodiment wherein instead of conductive strips 310, conductive wires 310b are applied, with isolators, such as 320 as defined in one of the preferred embodiments. All embodiments described above may apply, but now wires are applied. FIGS. 7b-7c schematically depict similar variants, in FIG. 7b without the channel, analogous to FIG. 6a, and in FIG. 7c, with channel, analogous to FIG. 6b, with again instead of conductive strips 310, conductive wires 310b are applied, with isolators, such as 320 as defined in one of the preferred embodiments. The wire may consist of a material as indicated above, or may comprise tungsten.

Figure 7D:
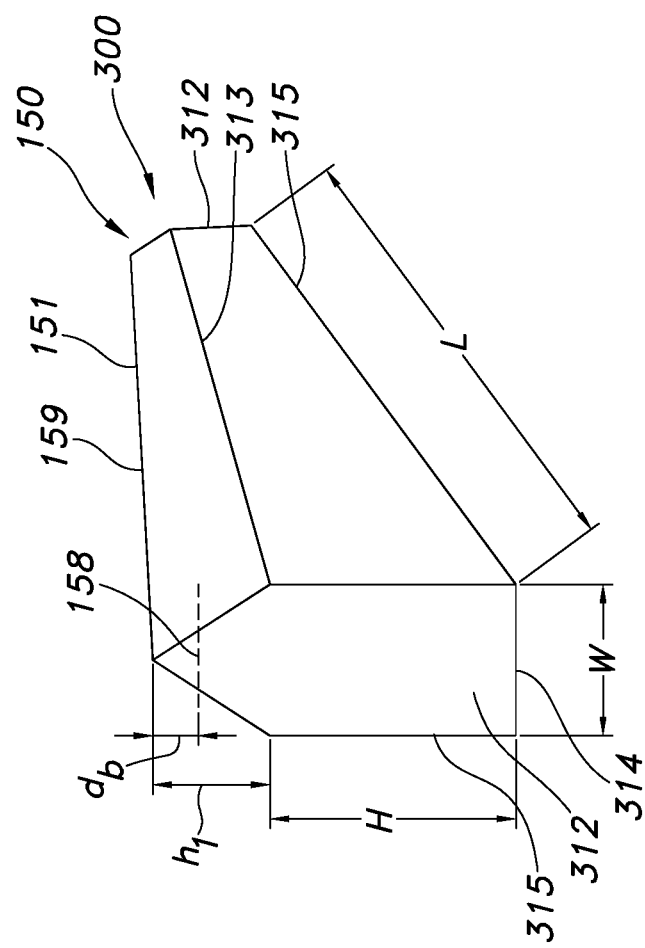

FIG. 7d schematically depicts an alternative conductive strip (310) with a longitudinal edge (313) comprising a longitudinal tooth structure (150), wherein the tooth structure (150) has a tooth top (151). The tooth structure may have a ridge 159 over a substantial part of the length L of the conductive strip, such as over 80-100% of the length L.

The gas purification system may further comprise a control unit (not depicted), configured to control the corona discharge system, especially the voltage generator, and the gas transport unit.

Figure 8C:
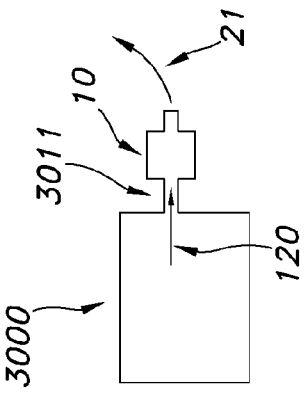
FIGS. 8a-8e very schematically depict a non-limiting number of applications.
Figure 8E:
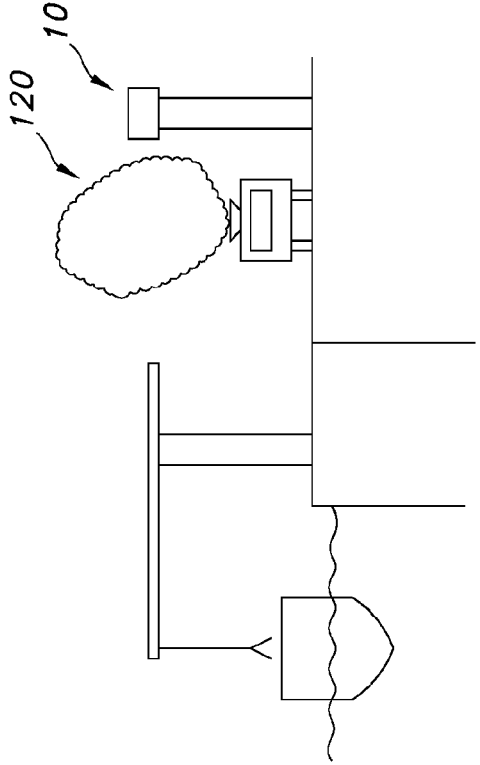
Figure 8B:
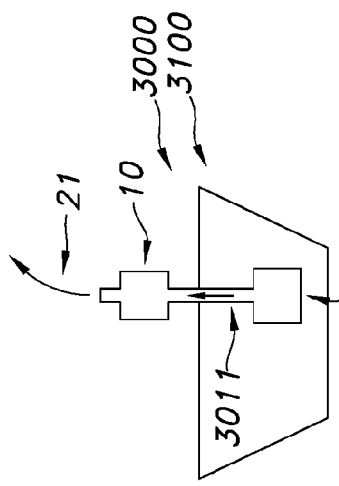
Figure 8D:
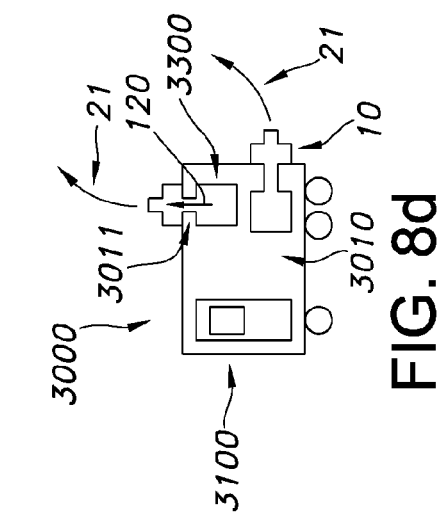
Figure 8A:
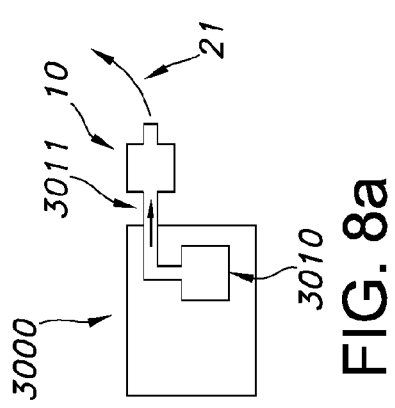

FIGS. 8a-8e very schematically depict a non-limiting number of applications. Reference 3000 indicates an application. This application may for instance be a mobile application 3100, such as schematically depicted in FIGS. 8b (by way of example a ship) and 8c (by way of example a very schematically drawn street sweeper or road building vehicle for for instance application of asphalt). FIGS. 8a, 8b and 8d schematically depict variants wherein the application comprises an engine 3010, especially a hydrocarbon based engine, which emits an exhaust gas, indicated with reference 3011. A downstream arranged gas purification system 10, configured to purify at least part of the exhaust gas of the engine 3011 is included in the application 3000. A purified gas 21 may be obtained. FIGS. 8c, 8d and 8e schematically also show other applications, which by definition of their use may generate small particles. FIG. 8a is a general picture, wherein the application 3000 may be any application, such as a street sweeper (see also FIG. 8d) or a transhipment site (see also FIG. 8e) of bulk products like particulate bulk products such as maize, corn, fruit, nuts, potatoes, flour, sand, ore, vegetables, etc. etc. FIG. 8d thus shows an application wherein small particles may be generated due to an engine and/or due to its application, such a street sweeping, asphalt application, etc. FIG. 8e shows an embodiment of a transhipment site, where also small particles may be generated, indicated with reference 120, which may removed with the gas purification system 10. It is further referred to FIGS. 5a-5f, 6a-6c, 7a-7d for other applications, which can generally be symbolized by—amongst others—schematic drawings 8a and 8c.

Especially FIGS. 8b and 8d schematically depicts embodiments of a motorized vehicle, comprising a gas purification system configured to purify an exhaust gas of the motorized vehicle, wherein the gas purification system (10) comprises a corona discharge system, the corona discharge system comprising: (a) a conductive strip with longitudinal edges, wherein one or more of the longitudinal edges comprise tooth structures, wherein the tooth structures at the one or more longitudinal edges (313,314) have tooth tops with shortest distances selected from the range of 2-200 mm, (b) a counter electrode, and (c) a voltage generator configured to apply a DC voltage of at preferably least 10 kV to the conductive strip. A gas purification system such as schematically depicted in FIGS. 2f-2g, 4a-4f, (7a), 9a-9b or elements thereof, may be applied. It is further referred to specific embodiments that may also be applied, such as schematically depicted in FIGS. 2d, 9a and 9c.

FIG. 9a schematically depicts a further application 3000. The gas purification system 10 is shown, which is configured to receive gas 20 that has to be purified. Gas 20 may for instance be gas generated by a street sweeper, especially the exhaust of a vacuum system of such street sweeper. Such application is configured to sweep the street, and material is removed from the street with the vacuum system. The vacuum system produce an (vacuum system) exhaust gas which contains fine dust, etc. The gas purification system 10 may reduce the amount of fine dust in said gas 20. In this embodiment of the gas purification system 10—which is not especially limited to this application 3000, an elongated gas channel 100 is applied that is folded. This may save space, and nevertheless create a (long) elongated gas channel 100. The walls may comprise counter electrodes 340, and in this embodiment, part of the elongated gas channel 100 is at one side of one of the counter electrodes 340, and a downstream part of the elongated gas channel is at an opposite side of said one of the counter electrodes 340. Here, the counter electrode 340 in the middle is used to elongate the gas channel. In fact, this might be seen as a kind of (electrically conductive) baffle. In one part of the elongated gas channel 100 (at one side of the middle counter electrode), a first conductive strip 310a is arranged, and in other part of the elongated gas channel 100 (at the other side of the middle counter electrode), a second conductive strip 310b is arranged.

Hence, also in this embodiment, the gas purification system 10 comprises conductive strip(s) 310 (each) with a longitudinal edge comprising tooth structures, wherein the tooth structures have tooth tops with shortest distances (between the tooth tops (at the same edge of the strip)) selected from the range of 0.5-1000 mm, especially selected from the range of 2-200 mm, and (b) the counter electrode ("second electrode") 340. The gas purification system 10 further comprise (c) a voltage generator configured to apply a DC voltage of preferably at least 5 kV, especially at least 10 kV, to the conductive strip. This generator is not separately depicted in this and the further (and previous) schematic drawings.

Figure 9B:
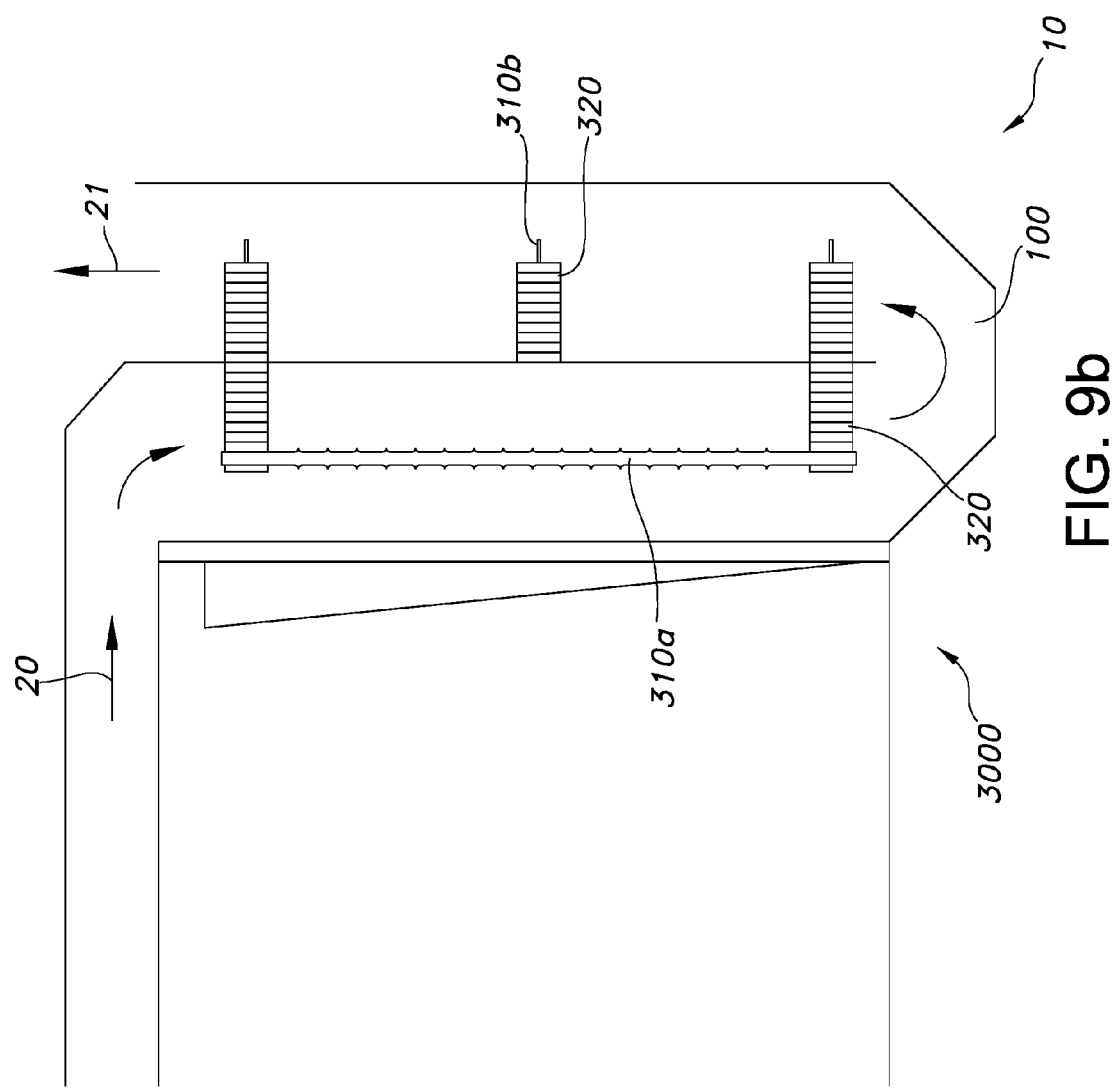
Figure 9C:
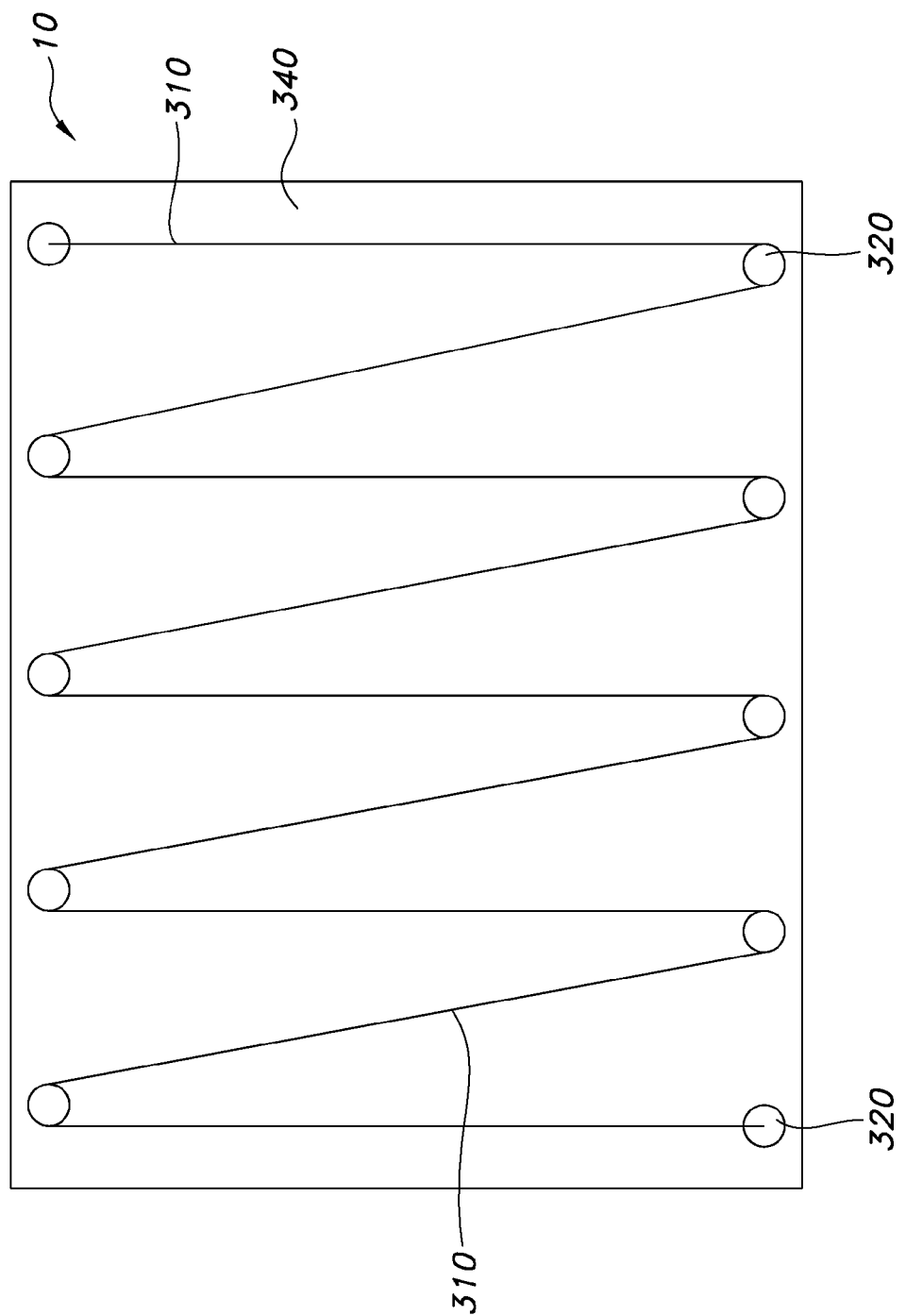

FIG. 9b schematically depicts a variant with respect to the embodiment schematically depicted in FIG. 9a. One optional difference is the fact that the isolators, such as with conductive strips 310 are all attached to one counter electrode. Another optional variant is that the conductive strips, here first conductive strip 310a and second conductive strip 310b are arranged with respect to each other having a non-zero angle. In FIG. 9a, the conductive strips are aligned parallel (with a mutual angle of 0°), whereas in FIG. 9b they have a mutual angle of 90°. Two or more different arrangements of two or more conductive strips may especially be advantageous to reduce the fine dust content in the gas 20. The application 3000 may again be a street sweeper, though this configuration of the gas purification system 10 may also be applied for other purposes or in other applications.

FIG. 9c schematically depicts a further embodiment, of an (elongated) arrangement of the conductive strip 310, which may be a folded long conductive strip or a plurality of conductive strips which are arranged head-tail and in electrical conductive arrangement with each other. Such arrangement may be applied in such street sweeper, but also in other applications described and/or depicted above.

EXPERIMENTAL

Comparative measurements were performed on a wire and strips according to the invention. Fine dust PM10 was measured in a channel with rectangular shape, with a flow speed of 4.7 m/s. The length of the conductive strips or wire was 4.45 m. The counter electrode, aluminium, had a surface of 2.9 m$^2$; the voltage was over 32 kV.

The following results were obtained:

| Type | dt (mm) | type | Reduction (%) | Power consumption |
|---|---|---|---|---|
| Wire | — | — | <60 | Relative high |
| Tooth structures | 15 | 1g | 60 | Relative low |
| Tooth structures | 50 | 1h | 60 | Relative low |
| Tooth structures | 50 | 1i | 61 | Relative low |
| Tooth structure | — | 7d | <50 | Relative low |

Hence, with lower power consumption, the reduction can be as high or even higher.

The strip with tooth structures may also be indicated as point discharge strip. It appears that the point discharge strip is robust, more robust that prior art solutions known to the inventors. Further, especially when at least part of the total number of the tooth structures point in the direction of counter electrode, the energy consumption may be lower than for instance when using only a "plain" wire electrode. The point discharge strip may be rather insensitive to vibrations, better than solutions with only a wire electrode or only needles. Further, the counter electrode (and point discharge strip) may easily be cleaned, such with a high pressure washer. In addition, no protective fame may be necessary, though it may be applied. The point discharge strip with toot structures at both longitudinal edges has even lower energy consumption and an even better reduction than identical point discharge strip with tooth structures at only one longitudinal edge.

A further experiment was performed, wherein a conductive strip with tooth structures at one longitudinal side was compared with a conductive strip with tooth structures at both longitudinal edges. The voltage applied to the strip was 35 kV.

| Electrode type | Current (μA) | Reduction (%) |
|---|---|---|
| Strip with single side sharp structures, with distance 25 mm between tooth tops | 600 | 17.6 |
| Strip with both side sharp structures, with distance 25 mm between tooth tops | 710 | 25.1 |

A further experiment was executed, with electrodes of a first type, with at both side teeth, with tooth top distances of 25 mm. The length of the electrode strip was 1.2 m. Also a second electrode was applied, which was 3 parallel arranged electrode strips of each 1.2 m, but with the same tooth. These two sets of electrodes are configured in a channel, with the second electrode being arranged downstream of the first electrode (analogous to FIG. 9b).

The strips were arranged each other in a single channel, and the gas through the gas channel had a gas flow of 10.000 m$^3$/h. The fine dust was measured with both electrodes of, with only the first electrode on (34 kV), and with both the first (34 kV) and second electrode on (35 kV). The indication "HV" means "high voltage". The results are indicated in below table:

| Electrode type | Electrode type | Voltage (kV) | Voltage (kV) | Current (μA) | Current (μA) |
|---|---|---|---|---|---|
| 1$^{st}$ | 2$^{nd}$ | 1$^{st}$ | 2nd | 1$^{st}$ electrode | 2$^{nd}$ electrode |
| 2-sided Sequence 5 min off/5 min on/5 min on-on | 2-sided 1.2 m (3x) | 34 | 35 | 1320 | 770 |

| Conc. fine dust (mg$^3$) HV off | Conc. fine dust (mg$^3$) HV on | Conc. fine dust (mg$^3$) HV both on | Sample name | Max rendement (%) |
|---|---|---|---|---|
| 1.25 | 0.735 | 0.561 | PM10 | 55.12 |

A mean reduction of 55% was possible in this even non-optimized system. Realising that presently for instance car sweepers have no fine dust reducers, the application of the gas purification system, which can easily integrated in or arranged to the car sweeper, can reduce fine dust with at least 50%, but higher reductions seem feasible. This may contribute to public health.

COMPARATIVE EXAMPLE

The gas purification system such as schematically depicted in FIG. 4a was tested with different gas flow speeds (without gas return). The reduction in fine dust is above 50% with flow speeds in the range of 0.5-15 m/s, even in the range of 5-15 m/s, an even at gas speeds in the range of 10-15 m/s. This fine dust reduction is much larger than in know systems, or known from alternative systems that are based on electrostatic precipitators Especially, the invention may differ from such existing electrostatic precipitators because the gas purification system creates an autonomic "electric wind" in this invention instead of an extra enforced wind as needed in electrostatic precipitators. Furthermore this invention does not only create a corona discharge and ionization, but also an induced uniform charges molecules and particulate matter to enforce an "electric wind" as essential part of the working of this innovation.

The invention claimed is:
1. A gas purification system comprising a corona discharge system, the corona discharge system comprising:
   a. a plurality of conductive strips, each conductive strip having longitudinal edges, wherein one or more of the longitudinal edges comprise tooth structures, wherein the tooth structures at the one or more longitudinal edges have tooth tops with shortest distances in a range of 2-200 mm;
   b. a counter electrode;

c. a voltage generator configured to apply a DC voltage of at least 10 kV to the conductive strip; and
a gas channel including said plurality of conductive strips and said counter electrode, and wherein the conductive strips are arranged in a zigzag like structure.

2. The gas purification system according to claim 1, wherein the tooth structures have tooth structure heights, defined by the difference in height between the tooth tops and valleys between adjacent tooth structures in a range of 0.5-500 mm, wherein the tooth structures have a ratio between the shortest distances and tooth structure height in a range of 0.5-1000, wherein the counter electrode is grounded, and wherein the conductive strip is attached to one or more isolators, wherein each isolator has a creeping length, wherein the creeping length is configured to be at least 5 mm creeping length per kV DC voltage; wherein the conductive strip has a thickness in the range of 0.1-10 mm, especially in the range of 0.1-5 mm.

3. The gas purification system according to claim 1, wherein the tooth structures of one of the longitudinal edges point in a direction of the counter electrode; wherein the counter electrode comprises a concave part; and wherein the counter electrode is grounded.

4. The gas purification system according to claim 1, wherein the counter electrode is negatively charged.

5. The gas purification system according to claim 1, wherein the conductive strip is attached to one or more isolators, wherein each isolator has a creeping length, wherein the creeping length is configured to be at least 5 mm creeping length per kV DC voltage, especially at least 10 mm creeping length per kV DC voltage.

6. The gas purification system according to claim 1, wherein the counter electrode is part of a belt of a conveyor belt, wherein the conveyor belt is configured to run the belt through the channel.

7. The gas purification system according to claim 1, further comprising a gas transport unit, configured to transport gas through the gas channel, and the gas purification system further comprising a gas return system, configured to recirculate at least part of the gas through the gas channel; wherein the gas transport unit is configured to transport the gas with a flow speed in a range of 2.5-25 m/s.

8. The gas purification system according to claim 1, comprising an arrangement of a plate like counter electrode and the conductive strip attached to the plate like counter electrode with one or more isolators in between.

9. A motorized vehicle, comprising a gas purification system according to claim 1, configured to purify an exhaust gas of the motorized vehicle.

10. The motorized vehicle according to claim 9, wherein the motorized vehicle is selected from the group consisting of a moped, a motor, a car, a truck, a coach, a train, a craft, a ship, a boat, and a street sweeper comprising the gas purification system configured to purify the exhaust gas of a vacuum system.

11. The motorized vehicle according to claim 9, further comprising a gas transport unit configured to transport the exhaust gas through the gas channel comprising said conductive strip and said counter electrode, wherein the gas transport unit is configured to transport the exhaust gas with a flow speed in a range of 2.5-25 m/s.

12. The motorized vehicle according to claim 9, wherein the motorized vehicle is configured to allow an exhaust gas flow through the gas channel for purification of said exhaust gas.

13. An accommodation, selected from the group consisting of a shed, a stable, a sty, a fold and a poultry farm, further comprising the gas purification system according to claim 1 for purifying the air of the accommodation.

14. A particle catch arrangement for the removal of one or more of fine dust bacteria, viruses, spores, fungi and parasites, especially bacteria, viruses and fungi, from a gas, the particle catch arrangement comprising the gas purification system according to claim 1, wherein at least part of the gas purification system is part of, or integrated with, an object comprising street furniture, for instance a sound barrier, a crash barrier, a tunnel wall, a road sign, a traffic information system, a street lamp or a traffic light.

15. A method for purifying a gas comprising leading said gas through the gas purification system according to claim 1 while applying a DC voltage of at least 10 kV to the conductive strip.

16. The method according to claim 15, wherein the gas comprises an exhaust gas of a motorized vehicle; wherein the motorized vehicle is selected from the group consisting of a moped, a motor, a car, a truck, a coach, a train, a craft, a ship, a boat, and a street sweeper.

17. The method according to claim 15 for purifying air of an accommodation, selected from the group consisting of a shed, a stable, a sty, a fold and a poultry farm, comprising leading gas of the accommodation through the gas purification system while applying a DC voltage of at least 10 kV to the conductive strip.

18. The method according to claim 15, comprising applying a DC voltage of at least 20 kV to the conductive strip; wherein the conductive strip is configured as positive electrode and wherein the counter electrode is earthed; the method further comprising applying an electric current of at least 0.2 µA per tooth structure and applying a stationary electric field between the conductive strip and the counter electrode in a range of 2-100 kV/m.

19. The method according to claim 15, further comprising transporting the gas through a gas channel comprising said conductive strip and said counter electrode with a flow speed in a range of 2.5-25 m/s.

20. The gas purification system according to claim 1, wherein the voltage generator is configured to apply an electric current in a range of 0.2-100 µA per tooth structure.

* * * * *